(12) United States Patent
Ahn et al.

(10) Patent No.: US 8,562,938 B2
(45) Date of Patent: *Oct. 22, 2013

(54) COMPOSITE SINTERING MATERIALS USING CARBON NANOTUBE AND MANUFACTURING METHOD THEREOF

(75) Inventors: Sang-chul Ahn, Seoul (KR); Sun-hwa Yang, Seoul (KR); Hyeung-eun Ahn, Seoul (KR)

(73) Assignee: Sang-Chul Ahn, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/344,308

(22) Filed: Jan. 5, 2012

(65) Prior Publication Data

US 2012/0134870 A1    May 31, 2012

Related U.S. Application Data

(62) Division of application No. 12/440,744, filed as application No. PCT/KR2007/004341 on Sep. 7, 2007, now Pat. No. 8,119,095.

(30) Foreign Application Priority Data

Sep. 11, 2006  (KR) .................. 10-2006-0087619
Mar. 9, 2007   (KR) .................. 10-2007-0023505

(51) Int. Cl.
*D01F 9/12* (2006.01)

(52) U.S. Cl.
USPC ..... 423/447.8; 252/502; 252/506; 252/518.1; 252/519.4; 252/521.2; 423/445 R; 423/447.1; 423/447.7; 977/700; 977/701; 977/742; 977/778

(58) Field of Classification Search
USPC ............ 252/500–519.4, 521.3; 423/445 R, 423/447.1, 447.7, 447.8; 977/700, 701, 977/742, 778

See application file for complete search history.

(56) References Cited

U.S. PATENT DOCUMENTS

| | | | |
|---|---|---|---|
| 3,956,531 A | 5/1976 | Church et al. | |
| 2002/0048526 A1* | 4/2002 | Nakamura et al. | ............... 419/14 |
| 2006/0188718 A1 | 8/2006 | Nitta | |
| 2007/0134496 A1* | 6/2007 | Katagiri et al. | ............... 428/408 |
| 2007/0181224 A1 | 8/2007 | Marya et al. | |

(Continued)

FOREIGN PATENT DOCUMENTS

| | | |
|---|---|---|
| JP | 2000-281303 | 10/2000 |
| JP | 2004010978 | 1/2004 |

(Continued)

*Primary Examiner* — Tri V Nguyen
(74) *Attorney, Agent, or Firm* — Lexyoume IP Meister, PLLC.

(57) ABSTRACT

The present invention relates to a composite sintering materials using a carbon nanotube (including carbide nano particles, hereinafter the same) and a manufacturing method thereof, the method comprises the steps of: combining or generating carbon nanotubes in metal powders, a compacted product, or a sintered product; growing and alloying the carbon nanotubes by compacting or sintering the metal powders, the compacted product, or the sintered product; and strengthening the mechanical characteristics by repeatedly performing the sintering process and the combining process or the generating process of the carbon nanotubes. The composite sintering materials using carbon nanotubes of the present invention have excellent mechanical, thermal, and electric and electronic characteristics as well as have effects of material cost reduction and manufacturing cost reduction due to reduced sintering temperature so that they are useful as materials for automotive parts, electric and electronic arts, space and aircraft parts, and molding and cutting tools, all of which include the composite sintering materials using carbon nanotubes.

1 Claim, 23 Drawing Sheets

(56) References Cited

U.S. PATENT DOCUMENTS

| | | |
|---|---|---|
| 2008/0003481 A1 | 1/2008 | Ecer |
| 2008/0093577 A1* | 4/2008 | Khraishi et al. ............. 252/67 |
| 2009/0208359 A1 | 8/2009 | Harrigan et al. |
| 2010/0303722 A1 | 12/2010 | Jin et al. |
| 2012/0177905 A1* | 7/2012 | Seals et al. ................ 428/221 |

FOREIGN PATENT DOCUMENTS

| | | |
|---|---|---|
| JP | 2004-304980 | 10/2004 |
| JP | 2005-179729 | 7/2005 |
| JP | 2006077293 | 3/2006 |
| JP | 2006147170 | 6/2006 |
| JP | 2006225205 | 8/2006 |
| WO | 2005/040068 | 5/2005 |
| WO | 2005040066 | 5/2005 |

* cited by examiner

COMPOSITE SINTERING MATERIALS USING CARBON NANOTUBE AND MANUFACTURING METHOD THEREOF

CROSS-REFERENCES TO RELATED APPLICATION

This application is a Divisional Application of U.S. patent application Ser. No. 12/440,744 filed on Mar. 11, 2009, now U.S. Pat. No. 8,119,095, which is a National Stage application of PCT/KR2007/004341 filed on Sep. 7, 2007, which claims priority to Korean Patent Application No. 10-2006-0087619 filed on Sep. 11, 2006 and Korean Patent Application No. 10-2007-0023505 filed on Mar. 9, 2007, the entire content of which is incorporated herein by reference.

TECHNICAL FIELD

The present invention relates to a composite sintering materials using a carbon nanotube (including carbide nano particles, hereinafter the same) and a manufacturing method thereof. The present invention is characterized by strengthening the mechanical characteristics of composite sintering materials by repeatedly performing processes of combining the carbon nanotubes with metal powders or generating the carbon nanotubes in the metal powders, impregnating and combining the carbon nanotubes in the pores of a compacted product or generating the carbon nanotubes in the pores, or impregnating and combining the carbon nanotubes in the pores of a sintered product or growing and alloying carbon nanotubes after generating the carbon nanotubes in the pores.

BACKGROUND ART

Composite sintering materials using a carbon nanotube of the present invention are completed by uniformly dispersing and combining the carbon nanotubes in metal powder particles, a compacted product, or a sintered product or generating the carbon nanotubes therein, and growing and alloying the carbon nanotubes, and then sintering them to have excellent mechanical, thermal, and electric and electronic characteristics as well as to have effects of material cost reduction and manufacturing cost reduction due to towered sintering temperature so that they are useful as materials for automotive parts, electric and electronic parts, space and aircraft parts, and molding and cutting tools, all of which include the composite sintering materials.

A representative carbon nanotube (CNT) among nanotubes has very excellent mechanical, thermal, and electrical characteristics and it is very thermally and chemically stable so that it can be applied as high elastic, high strength, and conductive composite material. Therefore, the carbon nanotube has been spotlighted as a new material usable in various fields such as polymer, ceramic composite material, etc., and it is a material that many studies have been made.

Since the carbon nanotube (CNT) known up to now has strong aggregation and high chemical stability, it is difficult to uniformly disperse it in a composite material matrix so that it is difficult to obtain carbon nano composite materials, making it impossible to effectively use the carbon nanotube (CNT).

As a result, various studies have recently been progressed in order to reveal the excellent characteristics of the carbon nanotube (CNT) using strong adhesive force with the matrix through the dispersion of the carbon nanotube (CNT) and a chemical processing.

Meanwhile, as a manufacturing method of metal composite materials, there has been proposed a casting method that infiltrates and disperses magnesium vapor in a porous molded product which is made of oxide based ceramics and at the same time, introduces nitrogen gas therein so as to infiltrate molten metal in the porous molded product, and a method of infiltrating metal materials as molten metal into carbon based materials which is dispersed with carbon materials using elastomer based on a pressing or non-pressing infiltration method. However, these methods are not sufficient in mechanical, thermal, electric and electronic characteristics.

TECHNICAL PROBLEM

It is an object of the present invention, to solve the above problems, to provide composite sintering materials and a manufacturing method thereof having excellent mechanical, thermal, and electric and electronic characteristics as well as having material cost reduction and manufacturing cost reduction due to lowered sintering temperature, so that they are useful as materials for automotive parts, electric and electronic parts, space and aircraft parts, and molding and cutting tools, all of which include the composite sintering materials.

TECHNICAL SOLUTION

In order to accomplish the objects, a first aspect of the present invention comprises the steps of: manufacturing master alloys by combining carbon nanotubes with metal powders; growing or alloying the carbon nanotubes by compacting and then sintering the master alloy; generating the carbon nanotubes in the pores of a sintered product or impregnating and combining the carbon nanotubes therein; and strengthening mechanical characteristics by repeatedly performing the sintering process and the generating process of the carbon nanotubes in the sintered product or the impregnating and combining processes of the carbon nanotubes.

A second aspect of the present invention comprises the steps of: generating carbon nanotubes in metal powders; growing or alloying the carbon nanotubes by compacting and then sintering the metal powders in which the carbon nanotubes are generated; generating the carbon nanotubes in the pores of a sintered product or impregnating and combining the carbon nanotubes therein; and strengthening mechanical characteristics by repeatedly performing the sintering process and the generating process of the carbon nanotubes in the sintered product or the impregnating and combining processes of the carbon nanotubes.

A third aspect of the present invention comprises the steps of: generating carbon nanotubes in the pores of a compacted product after compacting metal powders or impregnating the carbon nanotubes therein to 4 combine the metal powders with the carbon nanotubes in the pores of the compacted product; growing or alloying the carbon nanotubes by sintering the compacted product in which the carbon nanotubes are generated or with which the carbon nanotubes are combined; generating the carbon nanotubes in the pores of a sintered product or impregnating and combining the carbon nanotubes therein; and strengthening mechanical characteristics by repeatedly performing the sintering process and the generating process of the carbon nanotubes in the sintered product or the impregnating and combining processes of the carbon nanotubes.

A fourth aspect of the present invention comprises the steps of: generating carbon nanotubes in the pores of a finished product which is sintered after compacting metal powders or impregnating the carbon nanotubes therein to combine the metal powders with the carbon nanotubes in the pores of a sintered product; growing or alloying the carbon nanotubes by resintering the sintered product in which the carbon nanotubes are generated or with which the carbon nanotubes are combined; generating the carbon nanotubes in the pores of the sintered product or impregnating and combining the carbon nanotubes therein; and strengthening mechanical characteristics by repeatedly performing the sintering process and the generating process of the carbon nanotubes in the sintered product or the impregnating and combining processes of the carbon nanotubes.

A fifth aspect of the present invention comprises the steps of: manufacturing master alloys by combining carbon nanotubes with metal powders or generating the carbon nanotubes in metal powders; mixing the master alloy or the metal powders, wherein the carbon nanotubes are generated, with another metal powders or ceramic materials; growing or alloying the carbon nanotubes by compacting and then sintering the mixture; impregnating and combining the carbon nanotubes in the pores of a sintered product or generating the carbon nanotubes therein; and strengthening mechanical characteristics by repeatedly performing the sintering process and the generating process of the carbon nanotubes in the sintered product or the impregnating and combining processes of the carbon nanotubes.

A sixth aspect of the present invention comprises the steps of: mixing metal powders with ceramic materials; compacting the mixture or compacting and then sintering it; impregnating and combining the carbon nanotubes in the pores of a compacted product or a sintered product or generating the carbon nanotubes therein; growing or alloying the carbon nanotubes by sintering the molded product or the sintered product in which the carbon nanotubes are generated or with which the carbon nanotubes are combined; generating the carbon nanotubes in the pores of the sintered product or impregnating and combining the carbon nanotubes therein; and strengthening mechanical characteristics by repeatedly performing the sintering process and the generating process of the carbon nanotubes in the sintered product or the impregnating and combining processes of the carbon nanotubes.

A seventh invention of the present invention comprises the steps of: manufacturing master alloys by mixing and combining carbon nanotubes and metal powders or generating the carbon nanotubes in the metal powders; mixing the master alloy or the metal powders, wherein the carbon nanotubes are generated, with polymer materials; growing the carbon nanotubes by melting the mixture by a heater; injection-molding the mixed melting material; and aging the injection-molded product.

The composite sintering materials using the carbon nanotubes of the present invention has excellent mechanical, thermal, and electric and electronic characteristics by manufacturing master alloys by mixing the carbon nanotubes with the metal powder particles, impregnating and combining the carbon nanotubes in the compacted product or the sintered product, or generating the carbon nanotubes in the metal powder particles, the compacted product, or the sintered product; interposing the carbon nanotubes suffering from the compacting process or the sintering process under proper conditions in the metal powder particles, the compacted product, or the sintered product; and then combining, growing, and alloying the carbon nanotubes.

In the step of manufacturing the master alloys by mixing and combining the carbon nanotubes with the metal powder particles or the step of impregnating and combining the carbon nanotubes in the compacted product or the sintered product, it is preferable to use the carbon nanotubes in the dispersed state through the physical and chemical processes, and in the step of generating the carbon nanotubes in the metal powder particles, the compacted product, or the sintered product, it is preferable to chemically process the metal powder particles, the compacted product, or the sintered product and then process them by injecting liquid or gas having carbon group. Also, in the step of generating the carbon nanotubes, it is preferable to use acidic solution such as nital, phosphoric acid, sulfuric acid, HF solution, etc. and liquid or gas having carbon group such as ammonia, carbonic acid gas, carbonated water, methane gas, methanol, acetylene, benzene, glucose, sugar etc.

The metal powder particles in the step of combining the carbon nanotubes or the matrix ingredients of the compacted product and the sintered product in the step of impregnating the carbon nanotubes are preferably Fe, Ni, Co, W, and Si, but may also be alloy powders in which Fe, Ni, Co, W, and Si are alloyed.

As other metal powders of the alloy powders, metal powders (Mo, Th, Ti, etc.) with high melting point or metal powders with low melting point (Al, Cu, Bi, Pb, Cd, Zn, Ce, Cs, K, Na, etc.) may be used.

Also, the metal powder particles in the step of generating the carbon nanotubes or the matrix ingredients of the molded product and the sintered product is preferably Fe, Ni, Co, W, and Si, but may also be alloy powders in which Fe, Ni, Co, W, and Si are alloyed.

As other metal powders of the alloy powders, metal powders (Mo, Th, Ti, etc.) with high melting point or metal powders with low melting point (Al, Cu, Bi, Pb, Cd, Zn, Ce, Cs, K, Na, etc.) may be used.

In the step of manufacturing the master alloys in the present invention, it is preferable that the master alloys are manufactured by drying it at a temperature of up to 300° C. under an inert gas atmosphere or by directly growing the carbon nano particles into the carbon nanotubes in the metal powder particles, in the step of generating the carbon nanotubes in the metal powders, the molded product, or the sintered product, it is preferable to generate the carbon nanotubes at a temperature of up to 1200° C. under an inert gas atmosphere, in the step of impregnating the carbon nanotubes in the compacted product or the sintered product, it is preferable to impregnate the carbon nanotubes using an impregnating machine at a temperature of up to 200° C., in the step of growing the carbon nanotubes, it is preferable to grow the carbon nanotubes at a temperature of up to 800° C. under an inert gas atmosphere, and in the step of alloying the carbon nanotubes, it is preferable to alloy the carbon nanotubes at a temperature of at least 900° C. under an inert gas atmosphere.

DESCRIPTION OF DRAWINGS

The above and other objects, features and advantages of the present invention will become apparent from the following description of preferred embodiments given in conjunction with the accompanying drawings, in which.

BEST MODE

Hereinafter, the constitution of the present invention will be described in detail with reference to the embodiments.

Embodiment 1

(1) Manufacture of Sample (a) Process of Manufacturing Master Alloy

The master alloy is manufactured by mixing and drying dispersed carbon nanotubes with AHC100.29 powder and ABC100.30 powder being used as a sintering alloy for an automotive structure, which are pure iron powder from Hoganas Co., DAB powder and DAE powder which is an alloy powder of iron, copper, nickel and molybdenum, PASC60 powder which is an alloy powder of iron and phosphorus, KAP powder which is an alloy powder of iron and tin, and pure copper powder.

The mixing method in the present embodiment 1 mixes the carbon nanotubes using a spraying non-gravity mixer to be able to uniformly distribute the dispersed carbon nanotubes, and the drying method performs a dry under an inert gas atmosphere.

Also, in the used carbon nanotube, its average diameter is 20 nano, and length is 10 μm. The commercialized metal powder particle has a powder size of 50 μm to 250 μm.

The metal powders and the carbon nanotubes are mixed by means of a spray method so that in the mixing ratio of the metal powder to the carbon nanotube, the carbon nanotube is 0.1 wt % based on weight ratio.

(b) Compacting Process

The manufactured master alloy is compacted in a tensile specimen shape to allow AHC100.29 powder to have density of 6.2 g/cm$^3$, 6.4 g/cm$^3$, 6.6 g/cm$^3$, 6.8 g/cm$^3$ by being pressed by means of the press of 200 ton. And ASC 100.30, DAE, DAB, PASC60, KAP and pure copper powder are pressed by means of the press of 200 ton to have density of 6.8 g/cm$^3$.

(c) Sintering Process

Each of the manufactured three types of AHC100.29 specimens (density of 6.2 g/cm$^3$, 6.4 g/cm$^3$, 6.6 g/cm$^3$) is sintered for one hour at a temperature of 100° C., 200° C., 300° C., 400° C., and 500° C. Also, the manufactured specimens (AHC100.29, ABC100.30, DAE, DAB, KAP, pure copper powder) at a density of 6.8 g/cm$^3$ are sintered for one hour at a temperature of 750° C., 900° C., 1000° C., and 1100° C.

The sintering atmosphere is performed under nitrogen atmosphere and a Mesh Belt sintering furnace is used.

(2) Microstructure Analysis by Electron Microscope

As to three (6.2 g/cm$^3$, 6.4 g/cm$^3$, 6.6 g/cm$^3$ in density as AHC100.29 powder) of the specimens manufactured according to the process, the distribution situation, size of pores and the alloying degree of pure iron powder articles are examined by an electron microscope.

In order to take the electron microscope photograph, a wafer polishing is performed at final 1 μm powder, but only four types of 200° C., 300° C., 400° C., and 500° C. maintain mechanical strength capable of standing the polishing. However, the polishing cannot be performed on the specimen sintered at 100° C. since the particles are come off during the polishing.

Figure 1:
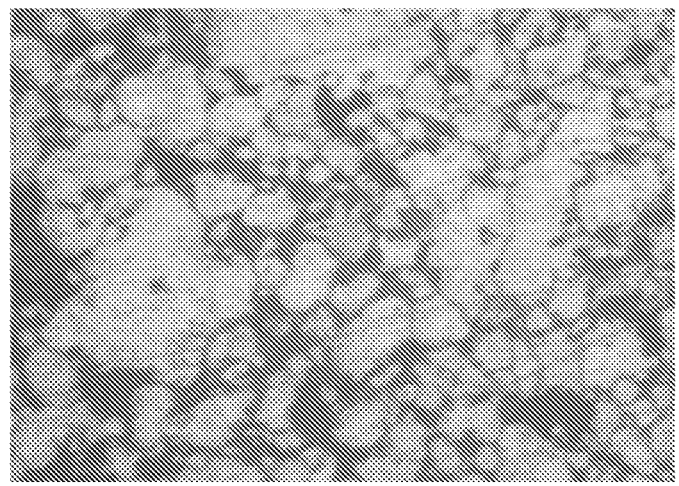
FIG. 1 is an electron microscope photograph by 200 magnifications of a tensile specimen according to an embodiment 1 of the present invention, that obtained by forming the master alloy including AHC100.29 powder with a density of 6.2 g/cm$^3$ and sintering at a temperature of 400° C.
Figure 2:
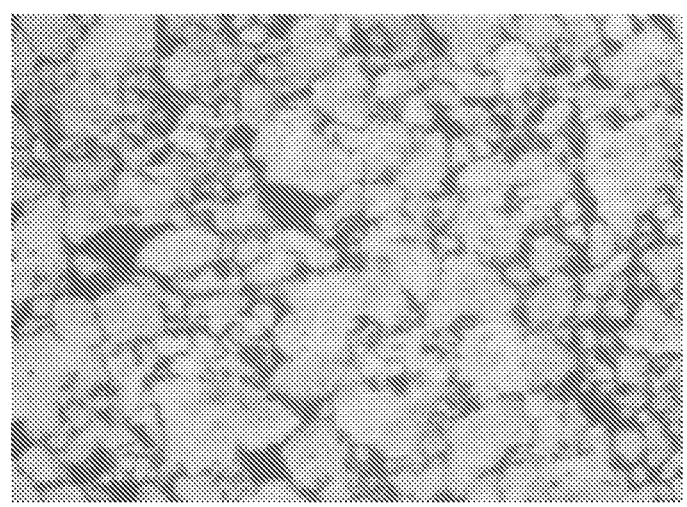
FIG. 2 is an electron microscope photograph by 200 magnifications of a tensile specimen according to an embodiment 1 of the present invention, that obtained by forming the master alloy including AHC100.29 powder with a density of 6.2 g/cm$^3$ and sintering at a temperature of 500° C. according to an embodiment 1 of the present invention.
Figure 3:
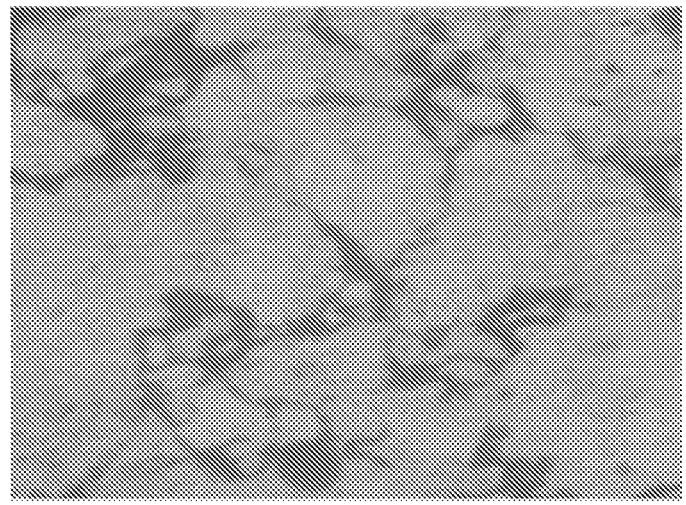
FIG. 3 is an electron microscope photograph by 400 magnifications of a tensile specimen according to an embodiment 1 of the present invention. that obtained by forming the master alloy including AHC100.29 powder with a density of 6.2 g/cm³ and sintering at a temperature of 400° C.

Each of FIG. 1 to FIG. 3 is an electron microscope photographs of a tensile specimen sintered at temperatures of 400° C. and 500° C. among tensile specimens that may be polished.

As shown in FIG. 1, in the tensile specimen sintered at 400° C., a shape (a cloud shape) of powder particles is substantially maintained, particularly, as shown in FIG. 2, in the tensile specimen sintered at 500° C., the sintered structure sintered at 1150° C., which is a sintering temperature of iron based powders in an existing powder metallurgy, is shown. Also, in FIG. 3 enlarging FIG. 1, it can be found that fine alloy layers (combining sites of carbon nanotubes) are uniformly dispersed in each powder particle.

(3) Microstructure Analysis by Scanning Electron Microscope (SEM)

To check a distribution shape of carbon nanotubes and a generation of carbon nanotubes shown through a ruptured-sectional surface after broking a sintered tensile specimen, a connection and combination shape between powders, and a shape of carbon nanotubes at the ruptured-sectional surface, as a master alloy of AHC100.29 powder shaped with a density of 6.2 g/cm$^3$, FIG. 4 to FIG. 8 are scanning electron microscopes (SEM) (500 and 10000 magnifications) of a ruptured-sectional surface of a tensile specimen obtained by respectively sintering at temperatures of 300° C., 400° C., and 500° C.

This measurement is performed by the scanning electron microscope of 500 magnifications or 10000 magnifications.

Figure 4:
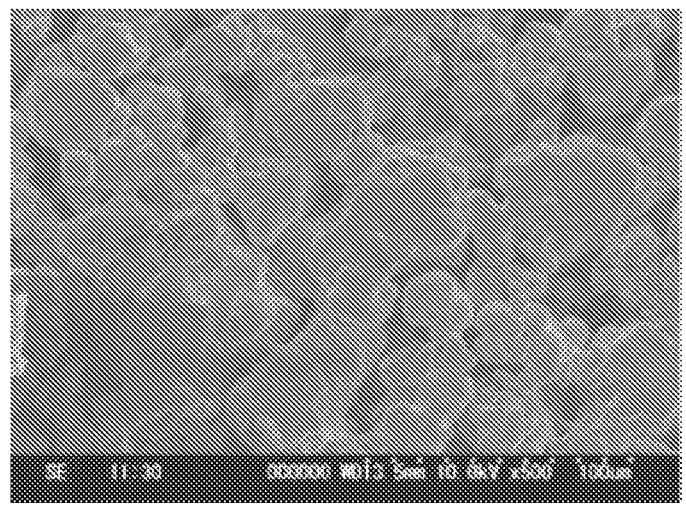
FIG. 4 is a scanning electron microscope photograph (SEM) by 500 magnifications of a ruptured-sectional surface of a tensile specimen according to an embodiment 1 of the present invention, that obtained by compacting the master alloy including AHC100.29 powder with a density of 6.2 g/cm³ and sintering at a temperature of 400° C.
Figure 5:
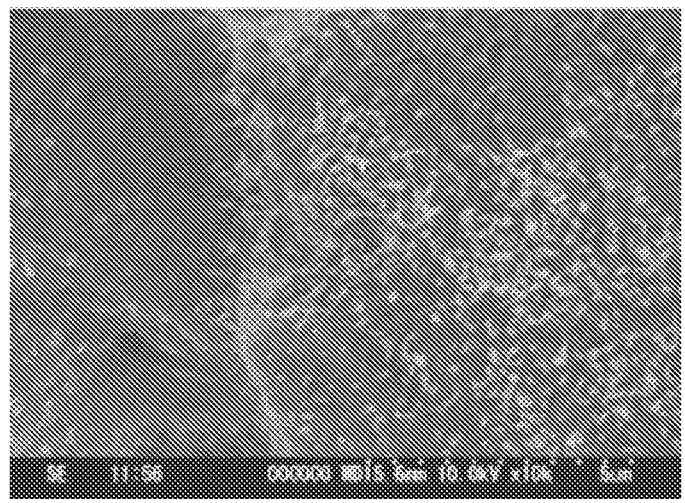
FIG. 5 is a scanning electron microscope photograph by 10000 magnifications showing a ruptured-sectional surface of a tensile specimen according to an embodiment 1 of the present invention, that obtained by compacting the master alloy including AHC100.29 powder with a density of 6.2 g/cm³ and sintering at a temperature of 300° C.
Figure 6:
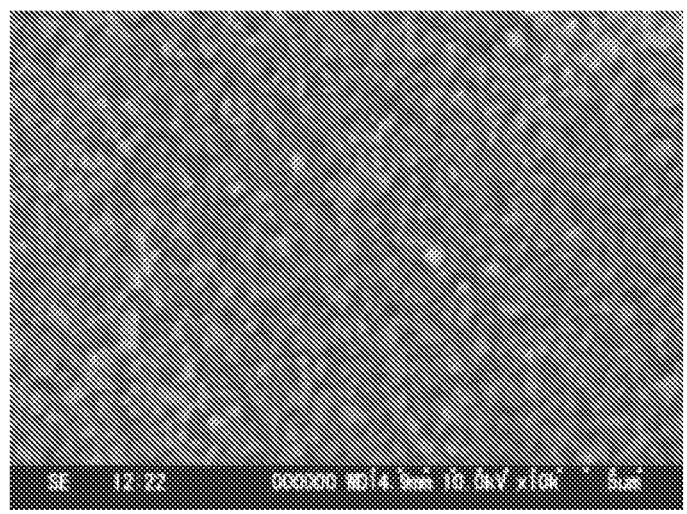
FIG. 6 is a scanning electron microscope photograph by 10000 magnifications showing of a ruptured-sectional surface of a tensile specimen according to an embodiment 1 of the present invention, that obtained by compacting the master alloy including AHC100.29 powder with a density of 6.2 g/cm³ and sintering at a temperature of 500° C.
Figure 7:
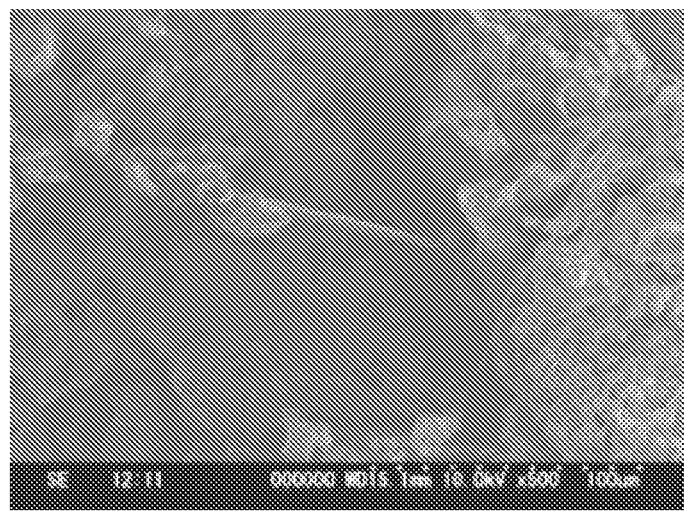
FIG. 7 is a scanning electron microscope photograph by 500 magnifications showing of a ruptured-sectional surface of a tensile specimen according to an embodiment 1 of the present invention, that obtained by compacting the master alloy including AHC100.29 powder with a density of 6.2 g/cm³ and sintering at a temperature of 500° C.
Figure 8:
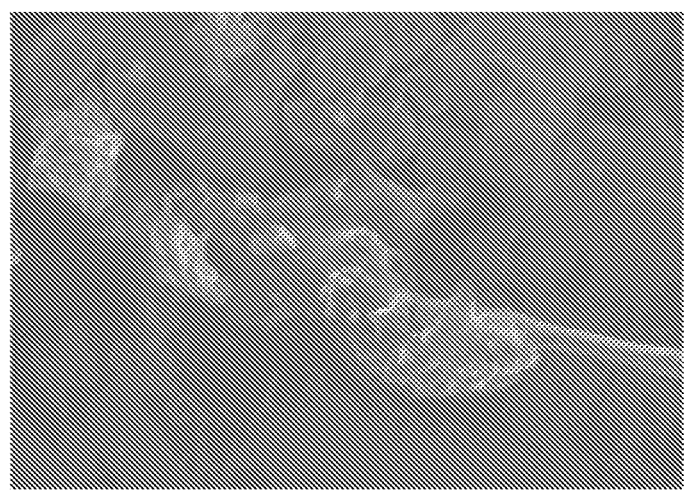
FIG. 8 is a partial magnified photograph of the connection part shown in FIG. 7.
Figure 9A:
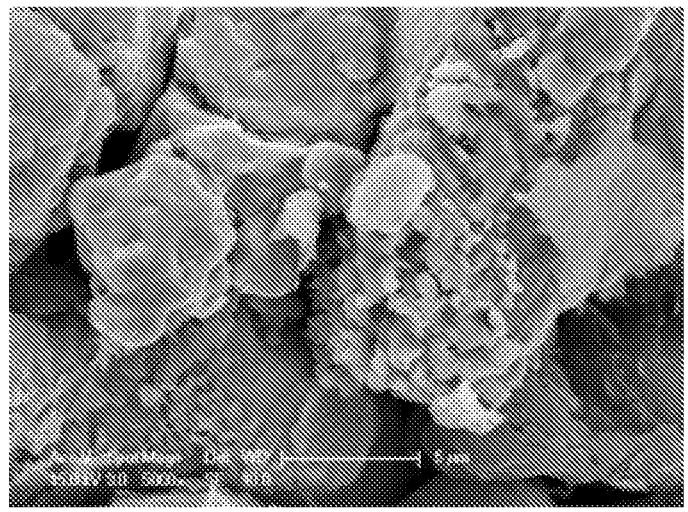
FIG. 9a is a scanning electron microscope photograph by 5000 magnifications showing a tensile specimen according to an embodiment 1 of the present invention, that obtained by compacting the master alloy including AHC100.29 powder with a density of 6.8 g/cm³ and sintering at a temperature of 750° C.
Figure 9B:
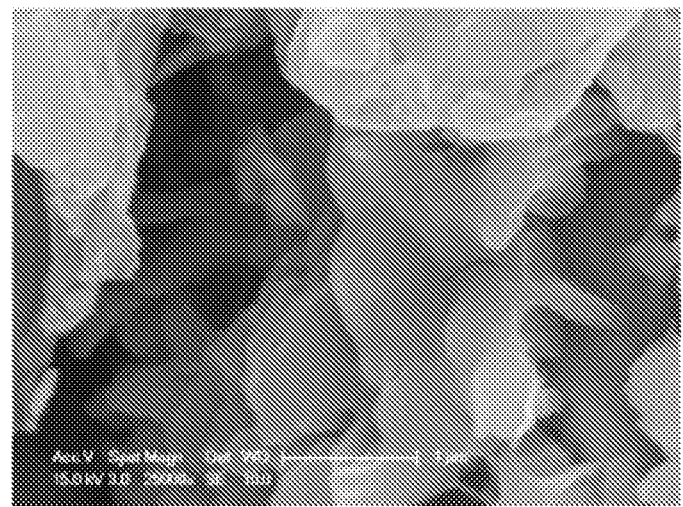
FIG. 9b is a scanning electron microscope photograph by 25000 magnifications showing a tensile specimen according to an embodiment 1 of the present invention, that obtained by compacting the master alloy including AHC100.29 powder with a density of 6.8 g/cm³ and sintering at a temperature of 750° C.
Figure 10A:
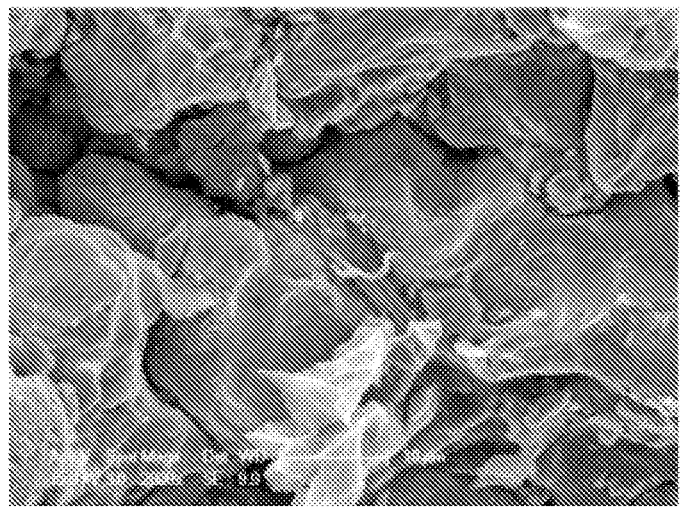
FIG. 10a is a scanning electron microscope photograph by 2000 magnifications showing a tensile specimen according to an embodiment 1 of the present invention, that obtained by compacting the master alloy including AHC100.29 powder with a density of 6.8 g/cm³ and sintering at a temperature of 900° C.
Figure 10B:
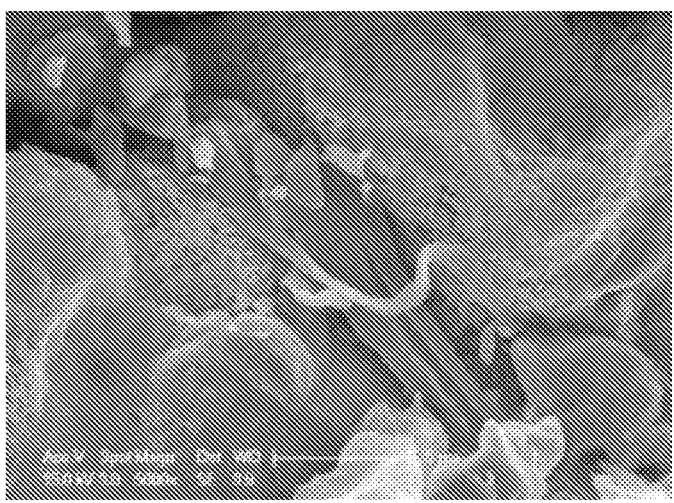
FIG. 10b is a scanning electron microscope photograph by 5000 magnifications showing a tensile specimen according to an embodiment 1 of the present invention, that obtained by compacting the master alloy including AHC100.29 powder with a density of 6.8 g/cm³ and sintering at a temperature of 900° C.
Figure 11A:
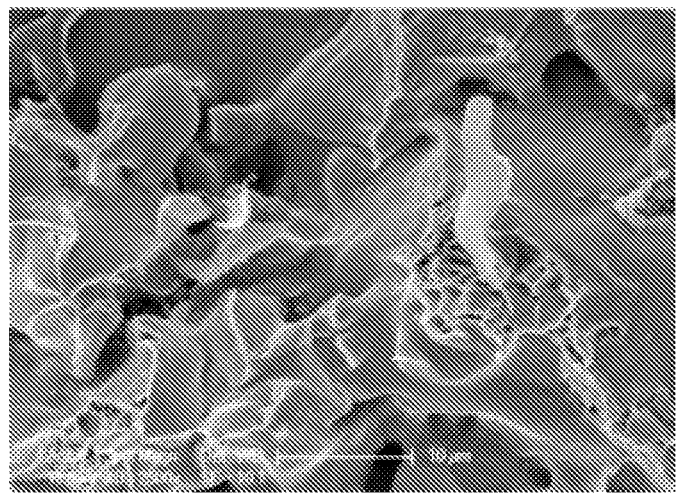
FIG. 11a is a scanning electron microscope photograph by 2500 magnifications showing a tensile specimen according to an embodiment 1 of the present invention, that obtained by compacting the master alloy including AHC100.29 powder with a density of 6.8 g/cm³ and sintering at a temperature of 1000° C.
Figure 11B:
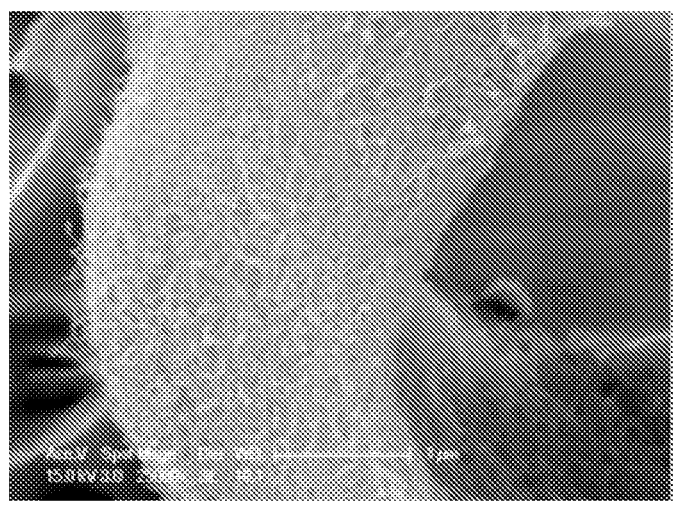
FIG. 11b is a scanning electron microscope photograph by 25000 magnifications showing a tensile specimen according to an embodiment 1 of the present invention, that obtained by compacting the master alloy including AHC100.29 powder with a density of 6.8 g/cm³ and sintering at a temperature of 1000° C.
Figure 12A:
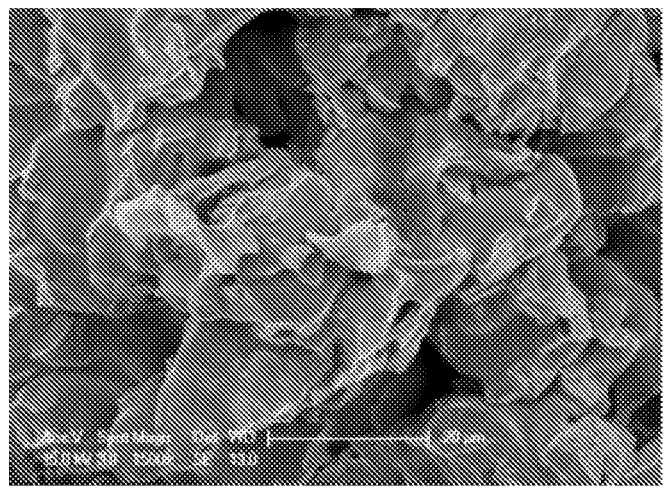
FIG. 12a is a scanning electron microscope photograph by 1500 magnifications showing a tensile specimen according to an embodiment 1 of the present invention, that obtained by compacting the master alloy including AHC100.29 powder with a density of 6.8 g/cm³ and sintering at a temperature of 1100° C.
Figure 12B:
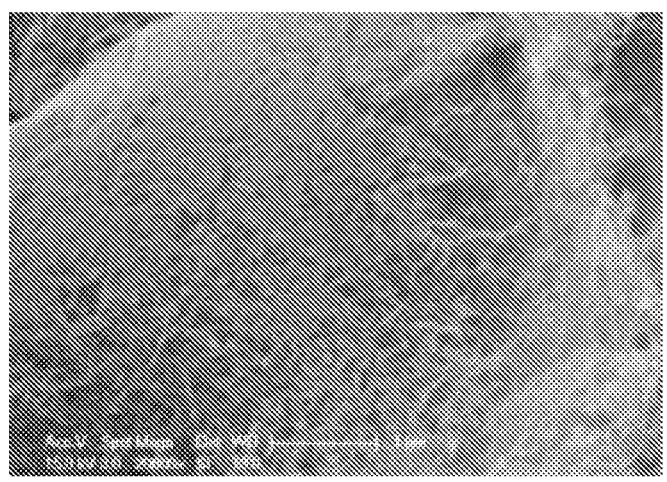
FIG. 12b is a scanning electron microscope photograph by 20000 magnifications showing a tensile specimen according to an embodiment 1 of the present invention, that obtained by compacting the master alloy including AHC100.29 powder with a density of 6.8 g/cm³ and sintering at a temperature of 1100° C.
Figure 13A:
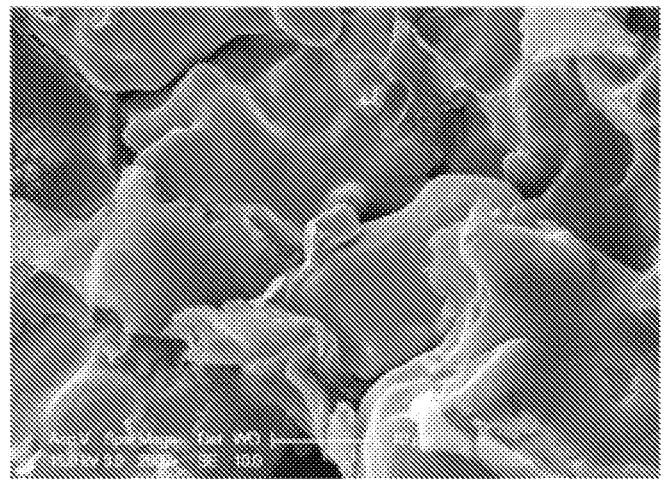
FIG. 13a is a scanning electron microscope photograph by 2000 magnifications showing a tensile specimen according to an embodiment 1 of the present invention, that obtained by compacting the master alloy including AHC100.29 powder with a density of 6.8 g/cm³ and sintering at a temperature of 1000° C.
Figure 13B:
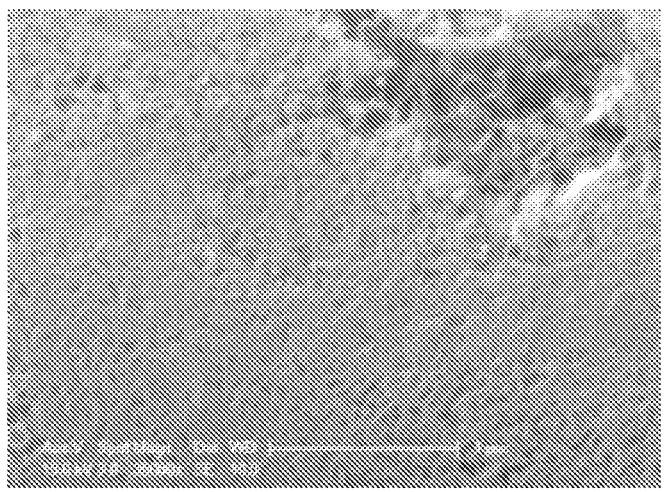
FIG. 13b is a scanning electron microscope photograph by 35000 magnifications showing a tensile specimen according to an embodiment 1 of the present invention, that obtained by compacting the master alloy including AHC100.29 powder with a density of 6.8 g/cm³ and sintering at a temperature of 1000° C.
Figure 14A:
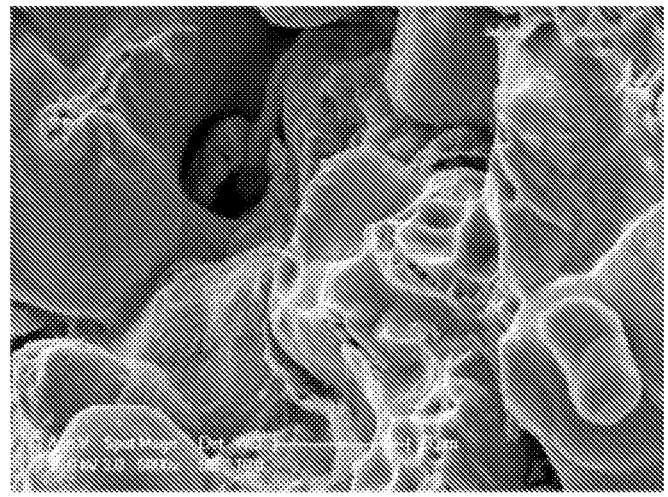
FIG. 14a is a scanning electron microscope photograph by 5000 magnifications showing a tensile specimen according to an embodiment 1 of the present invention, that obtained by compacting the master alloy including DAB powder with a density of 6.8 g/cm³ and sintering at a temperature of 1000° C.
Figure 14B:
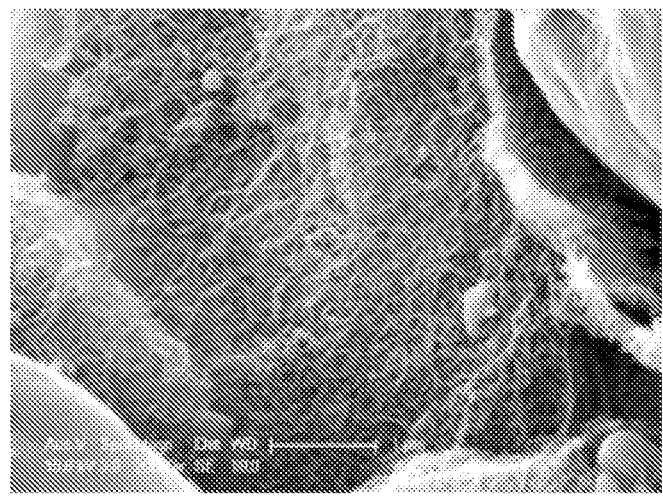
FIG. 14b is a scanning electron microscope photograph by 20000 magnifications showing a tensile specimen according to an embodiment 1 of the present invention, that obtained by compacting the master alloy including DAB powder with a density of 6.8 g/cm³ and sintering at a temperature of 1000° C.
Figure 15A:
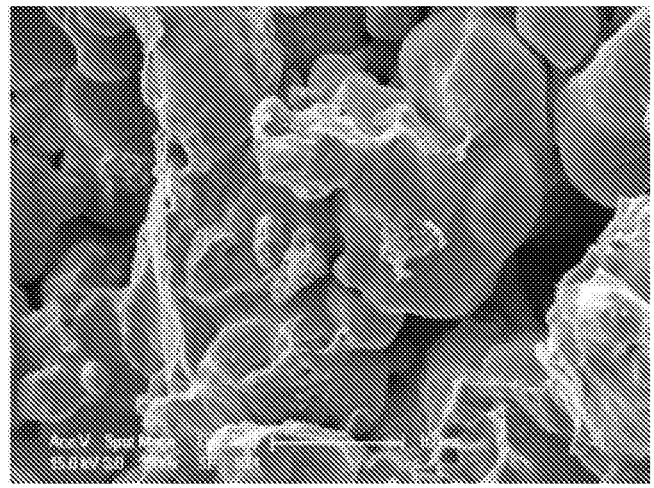
FIG. 15a is a scanning electron microscope photograph by 2500 magnifications showing a tensile specimen according to an embodiment 1 of the present invention, that obtained by compacting the master alloy including DAE powder with a density of 6.8 g/cm³ and sintering at a temperature of 1000° C.
Figure 15B:
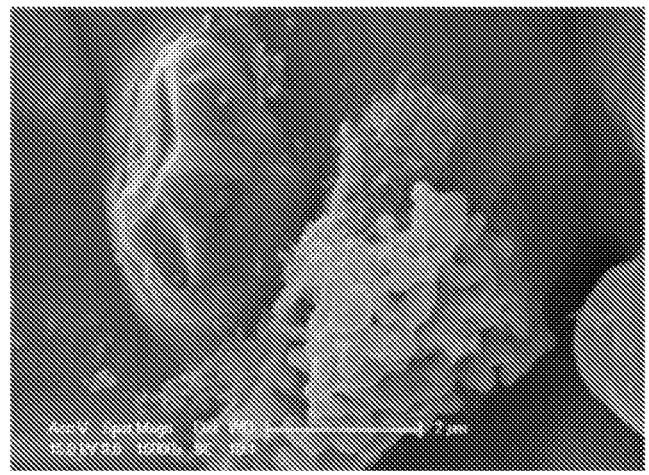
FIG. 15b is a scanning electron microscope photograph by 15000 magnifications showing a tensile specimen according to an embodiment 1 of the present invention, that obtained by compacting the master alloy including DAE powder with a density of 6.8 g/cm³ and sintering at a temperature of 1000° C.
Figure 16A:
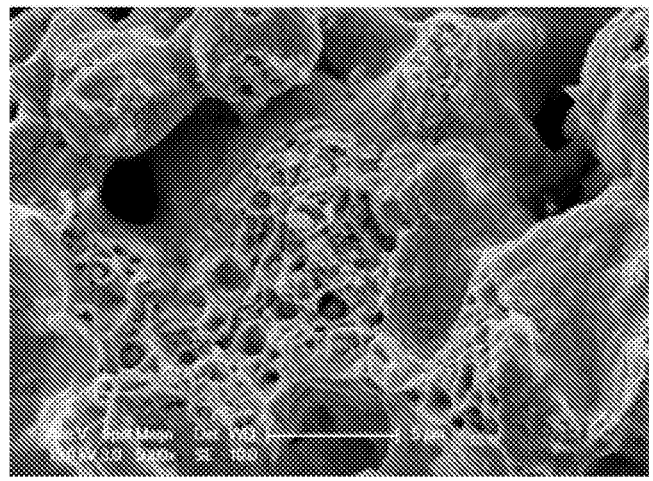
FIG. 16a is a scanning electron microscope photograph by 5000 magnifications showing a tensile specimen according to an embodiment 1 of the present invention, that obtained by compacting the master alloy including KAP powder with a density of 6.8 g/cm³ and sintering at a temperature of 1000° C.
Figure 16B:
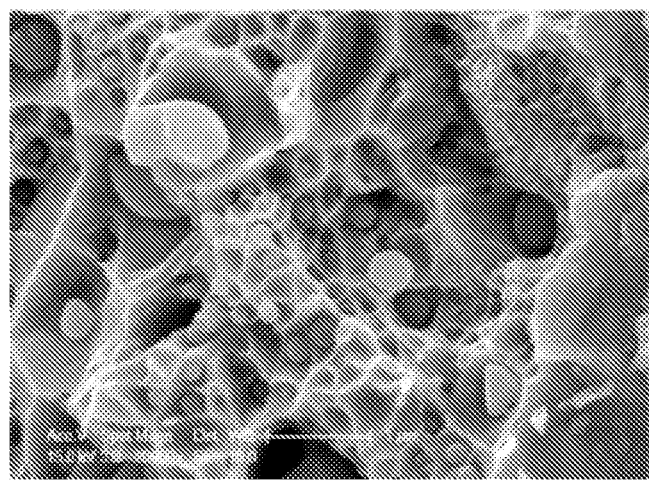
FIG. 16b is a scanning electron microscope photograph by 20000 magnifications showing a tensile specimen according to an embodiment 1 of the present invention, that obtained by compacting the master alloy including KAP powder with a density of 6.8 g/cm³, and sintering at a temperature of 1000° C.

Referring to FIG. 4, the existence of the carbon nanotubes distributed between the pores of the metal powder in the ruptured-sectional surface the tensile specimen sintered at the temperature of 400° C. is shown with a cloud shape, and the ruptured-sectional surface of the tensile specimen sintered at the temperature of 300° C. shows the carbon nanotubes grown like the photo of FIG. 5, however a shape that is not connected and combined is shown in many parts. However, a carbon nanotube growth composition that the carbon nanotubes are grown and combined is uniformly distributed in the in the ruptured-sectional surface of the tensile specimen sintered at the temperature of 500° C. as shown in FIG. 6, and this means that the growth speed of the carbon nanotubes is increased as the temperature is high. In additional, FIG. 7 shows a shape that an end of the carbon nanotube growth composition is combined by an alloy of the powder particles in the ruptured-sectional surface, and referring to FIG. 8 further enlarging this part, the ruptured shape of the above growth composition has an orthorhombic shape of carbide (cementite, Fe3C), the sintered combination trace between the powder particles around the combining parts is shown.

Next, among the tensile specimens that are sintered at a sintering temperature (750° C., 900° C., 1000° C., and 1100° C.) and the density of 6.8 g/cm$^3$, the tensile specimens of AHC100.29 powder, ABC100.30 powder, DAE powder, DAB powder, and KAP powder are selected and ruptured, and FIG. 9a to FIG. 16b show scanning electron microscope photographs (5000 magnifications-25000 magnifications, 2000 magnifications-5000 magnifications, 2500 magnifications-25000 magnifications, 1500 magnifications-20000 magnifications, 2000 magnifications-35000 magnifications, 5000 magnifications magnifications, 1000 magnifications-15000 magnifications, 5000 magnifications-20000 magnifications) of the distribution shape of carbon nanotubes, the growth of carbon nanotubes, a connection and combination shape between the powders, and a shape of carbon nanotubes of a ruptured-sectional surface.

As shown in FIGS. 9a to 16b, in the sintering temperature of 750° C. to 900° C., the shape of the small carbon nanotubes, which are uniformly dispersed, are disappeared and only the shape of the large carbon nanotubes remains. Also, considering the shape of large carbon nanotubes in the sintering temperature of 750° C. to 900° C., the shape of the nanotubes still remains. However, it can be found that in the sintering temperature of 1000° C. to 1100° C., the carbon nanotubes are changed into a shape where the large nanotubes get entangled in the small carbon nanotubes and are then changed into a shape covering the surfaces of the metal particles. And, the alloying is progressed in the portions where the carbon nanotubes are combined so that it can be found that as the sintering temperature is increased, the alloyed portions are widened. Therefore, if the master alloy powders uniformly dispersing and combining the carbon nanotubes in the powder particles are sintered, as the sintering temperature is raised, the alloying of the carbon nanotubes and the powder particles is progressed as well as the carbon nanotubes are combined and at the same time, grown, and when exceeding a particular temperature, the shape of the carbon nanotubes is broken, and then the carbon nanotubes then cover the surfaces of the powder particles and the alloying of the carbon nanotubes and the powder particles is continuously progressed. In the specimen that the master alloy powders dispersing and combining the carbon nanotubes in the KAP powders and the pure copper powders are sintered, it cannot be confirmed whether there are the carbon nanotubes.

(4) Mechanical Property Measurement by Hardness Test

The Vickers hardness test results per the sintering temperature for the tensile specimen of ACH100.29 powder formed with density of 6.2 g/cm$^3$, 6.4 g/cm$^3$, 6.6 g/cm$^3$ among the tensile specimens are indicated in the following Table 1.

The test method follows KS B 0811 (Method of Vickers hardness test). A test load of 98.1N (10 kg) is performed and a ten-point measurement is used. Each of two values from the top and bottom of the measured values is discarded so that the hardness is computed by performing an arithmetic mean using the remaining six points.

The Vickers hardness test results per the sintering temperature for the AHC100.29 powder specimen whose density is 6.2 g/cm$^3$, 6.4 g/cm$^3$, and 6.6 g/cm$^3$ are indicated in Table 1.

TABLE 1

<The hardness measurement results according to the change in sintering temperature and density>

| Sintering temperature | Density (g/cm$^3$) | Hardness (Hv = 10) |
|---|---|---|
| 100° C. | 6.2 | — |
|  | 6.4 | — |
|  | 6.6 | — |
| 200° C. | 6.2 | No measurement |
|  | 6.4 | No measurement |
|  | 6.6 | No measurement |
| 300° C. | 6.2 | No measurement |
|  | 6.4 | No measurement |
|  | 6.6 | No measurement |
| 400° C. | 6.2 | 10 |
|  | 6.4 | 10 |
|  | 6.6 | 12 |
| 500° C. | 6.2 | 16 |
|  | 6.4 | 17 |
|  | 6.6 | 22 |

As in the Table 1, although the sintering temperature is too low to measure the hardness values in the conventional powder metallurgy, the hardness values can be measured in 400° C. to 500° C. Also, as the density is increased, the hardness values per the sintering temperature become high.

The Vickers hardness test results per the sintering temperature for each powder for tensile specimens shaped with rest density of 6.8 g/cm$^3$ are indicated in the following Table 2.

As in the Table 2, the hardness values are very highly measured even in temperature (up to 1000° C.) lower than that of the conventional powder metallurgy (footnote 1). It can be found that the sintered product can be manufactured in temperature lower than that of the conventional powder metallurgy. However, the difference in the hardness values between two specimens sintered at 1000° C. and 1100° C., respectively, are different according to the powders. Accordingly, it can be found that there is the difference in the alloying temperature of the carbon nanotubes according to the powders.

TABLE 2

<The hardness measurement results according to the change in sintering temperature per power types>

| Powder name | Sintering temperature | Hardness (Hv = 10) |
|---|---|---|
| AHC100.29 | 750° C. | 70 |
|  | 900° C. | 78 |
|  | 1000° C. | 90 |
|  | 1100° C. | 104 |
| ABC100.30 | 750° C. | 86 |
|  | 900° C. | 101 |
|  | 1000° C. | 120 |
|  | 1100° C. | 121 |
| DAB | 750° C. | 76 |
|  | 900° C. | 85 |
|  | 1000° C. | 112 |
|  | 1100° C. | 127 |
| DAE | 750° C. | 76 |
|  | 900° C. | 85 |
|  | 1000° C. | 100 |
|  | 1100° C. | 122 |
| PASC60 | 750° C. | 82 |
|  | 900° C. | 105 |
|  | 1000° C. | 142 |
|  | 1100° C. | 158 |
| KAP | 750° C. | 68 |
| Pure copper | 750° C. | 38 |

Footnote 1) in the case of the sintering alloy for the automotive structure, the Vickers hardness values are as follows. SMF 4020M is at least 60, SMF 4030M is at least 80, SMF 4040M is at least 100, and SMF 9060M is at least 200, based on the sintered finished product (approximately sintering temperature 1150° C.).

(5) Mechanical Property Measurement by Tensile Test

The tensile test for the respective powder (AHC100.29, ABC100.30, DAB, DAE, PASC60, KAP, pure copper) specimens with density of 6.8 g/cm$^3$ among the specimens manufactured according to the process is performed by means of a universal testing machine.

The test specimen follows JIS Z 2550 (sintered materials for structural parts) and the test method performs the tensile test according to KS B 0802 (method of tensile test for metallic materials).

The tensile test results are indicated in the following table 3.

In as the table 3, although there is a tensile strength even in temperature (up to 1000° C.) lower than that of the conventional powder metallurgy (footnote 2), the carbon nanotube content of 0.1% is not enough to intensify the strength.

TABLE 3

<The tensile strength measurement result according to the change in the sintering temperature per powder types>

| Powder name | Sintering temperature | Tensile strength (kgf/mm$^2$) |
|---|---|---|
| AHC100.29 | 750° C. | 10.65 |
|  | 900° C. | 12.45 |
|  | 1000° C. | 14.14 |
|  | 1100° C. | 14.32 |
| ABC100.30 | 750° C. | 7.33 |
|  | 900° C. | 14.79 |
|  | 1000° C. | 15.04 |
|  | 1100° C. | 16.09 |
| DAB | 750° C. | 4.98 |
|  | 900° C. | 12.88 |
|  | 1000° C. | 16.47 |
|  | 1100° C. | 18.62 |
| DAE | 750° C. | 6.64 |
|  | 900° C. | 12.57 |
|  | 1000° C. | 18.77 |
|  | 1100° C. | 22.81 |
| PASC60 | 750° C. | 2.16 |
|  | 900° C. | 8.03 |
|  | 1000° C. | 22.87 |
|  | 1100° C. | 27.63 |
| KAP | 750° C. | 11.85 |
| Pure copper | 750° C. | 1.06 |

Footnote 2) in the case of the sintering alloy for the automotive structure, the Vickers hardness values are as follows. SMF 4020M is at least 20, SMF 4030M is at least 30, SMF 4040M is at least 40, and SMF 9060M is at least 60, based on the sintered finished product (approximately sintering temperature 1150° C.).

Embodiment 2

(1) Manufacture of Sample
(a) Process of Manufacturing Master Alloy
It is the same as the manufacturing process of the master alloy of the embodiment 1 except for selecting AHC100.29 powder, ABC100.30 powder, DAB powder, DAE powder, KAP powder, and pure copper powder.

(b) Compacting Process

The manufactured master alloy is compacted in a tensile specimen shape to allow AHC100.29, ASC 100.30, DAE, DAB, KAP, and pure copper powders to have density of 6.8 g/cm³ by being pressed by means of the press of 200 ton. The remaining processes are the same as the embodiment 1.

(c) Sintering Process

Each of the manufactured specimens is sintered for one hour at a temperature of 1000° C. and 1100° C. The remaining processes are the same as the embodiment 1.

(d) Process of Generating Carbon Nanotube (Toughness Adding Process)

Figure 17:
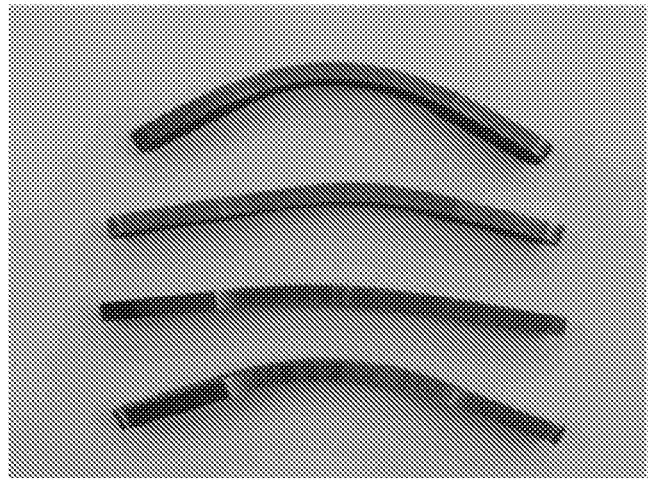
FIG. 17 is a photograph showing a transform by a banding of a tensile specimen according to an embodiment 2 of the present invention, which obtained by compacting the master alloy with a density of 6.8 g/cm³, and sintering in a temperature of 1000° C. and adding toughness.
Figure 18:
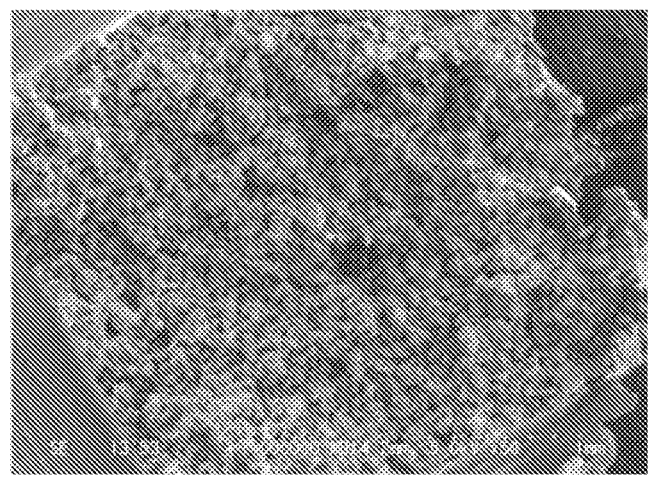
FIG. 18 is a scanning electron microscope photograph by 50 magnifications showing a ruptured-sectional surface of a tensile specimen according to an embodiment 2 of the present invention, that obtained by compacting the master alloy including PASC60 powder with a density of 6.8 g/cm³ and sintering at a temperature of 1000° C.

After dipping the manufactured finished product into diluted HF solution, nital, diluted sulfuric acid or phosphoric acid, and ammonia at a proper temperature is injected and acetylene, methane gas, or carbonic acid gas is then injected to generate the carbon nanotubes so that the toughness is added. When buckling the tensile specimens through the above described generation process of the carbon nanotubes, as shown in FIG. 17, the tensile specimens are only bended and are not ruptured. Therefore, according to the present invention, the sintered produce having the strength brittleness may be added with the toughness such that a mechanical manufacture applying a physical force outside for a transform is possible.

(2) Microstructure Analysis by Scanning Electron Microscope (SEM)

To show a dispersion of carbon nanotubes and a connection or a combination shape between powder, and a shape of a ruptured-sectional surface, each of FIG. 18 to FIG. 27 show scanning electron microscopes by 50 magnifications, 1000 magnifications, 5000 magnifications, and 20000 magnifications.

Figure 19A:
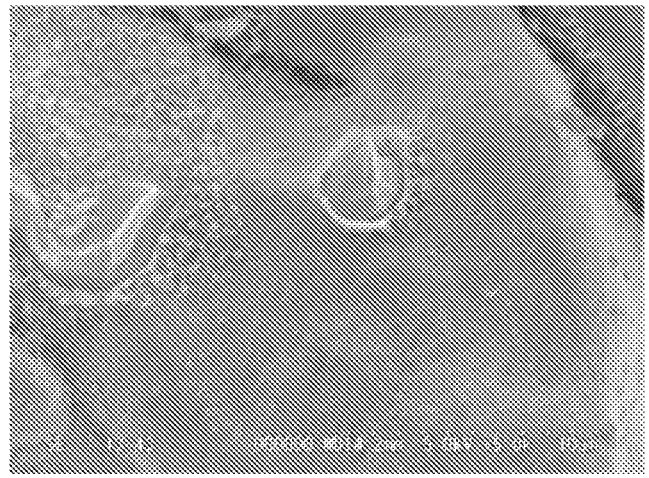
FIG. 19a is a scanning electron microscope photograph by 5000 magnifications of a tensile specimen according to an embodiment 2 of the present invention, that obtained by compacting the master alloy including DAE powder with a density of 6.8 g/cm³ and sintering at a temperature of 1000° C. and adding toughness.
Figure 19B:
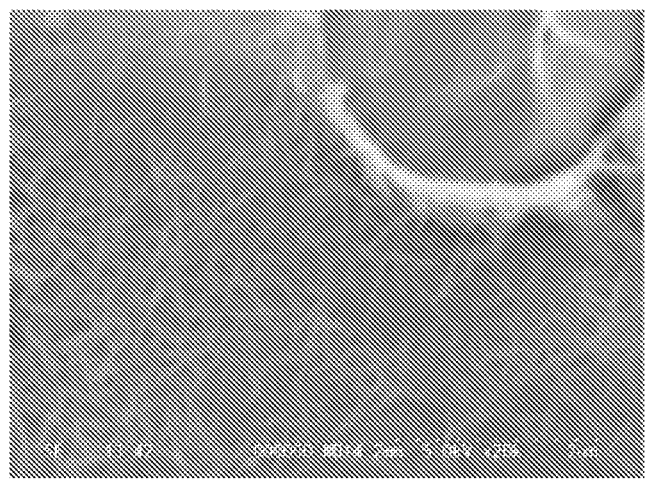
FIG. 19b is a scanning electron microscope photograph by 20000 magnifications of a tensile specimen according to an embodiment 2 of the present invention, that obtained by compacting the master alloy including DAE powder with a density of 6.8 g/cm$^3$ and sintering at a temperature of 1000° C. and adding toughness.
Figure 20A:
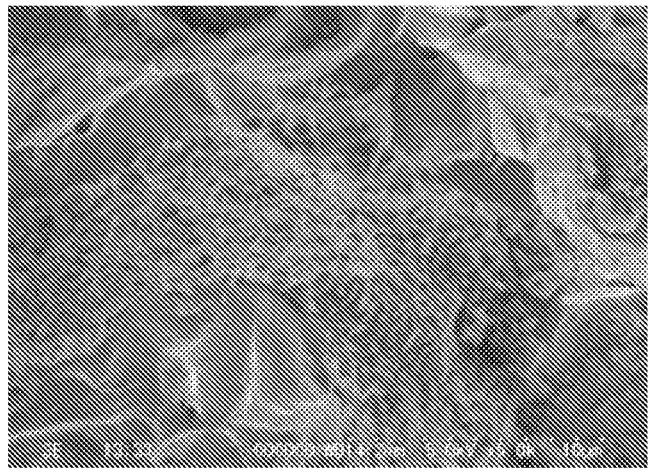
FIG. 20a is a scanning electron microscope photograph by 5000 magnifications of a tensile specimen according to an embodiment 2 of the present invention, that obtained by compacting the master alloy including PASC60 powder with a density of 6.8 g/cm$^3$ and sintering at a temperature of 1000° C. and adding toughness.
Figure 20B:
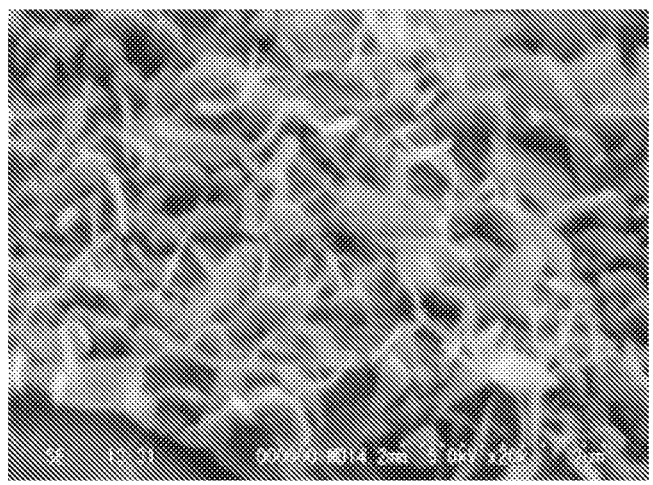
FIG. 20b is a scanning electron microscope photograph by 20000 magnifications of a tensile specimen according to an embodiment 2 of the present invention, that obtained by compacting the master alloy including PASC60 powder with a density of 6.8 g/cm$^3$ and sintering at a temperature of 1000° C. and adding toughness.
Figure 21:
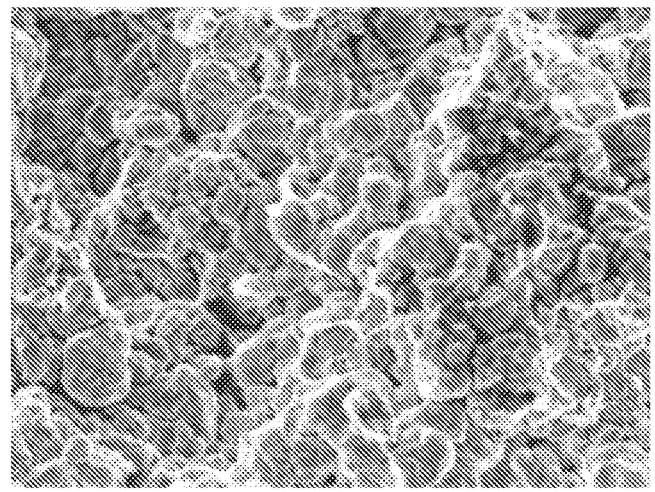
FIG. 21 is a scanning electron microscope photograph by 1000 magnifications of a tensile specimen according to an embodiment 2 of the present invention, that obtained by compacting the master alloy including AHC100.29 powder with a density of 6.8 g/cm$^3$ and sintering at a temperature of 1000° C. and adding toughness.
Figure 22:
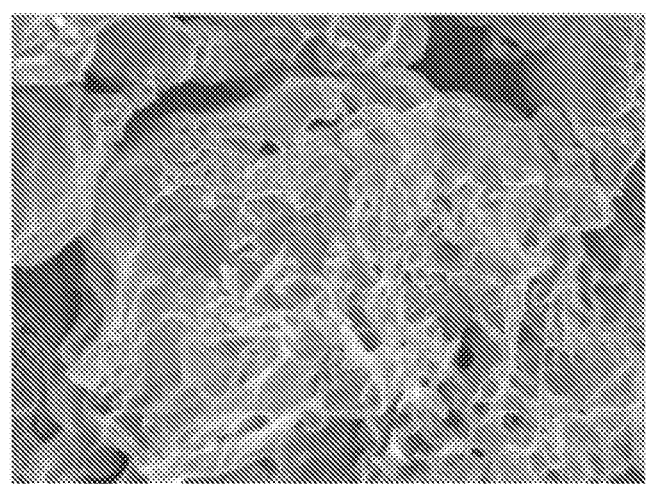
FIG. 22 is a scanning electron microscope photograph by 1000 magnifications of a tensile specimen according to an embodiment 2 of the present invention, that obtained by compacting the master alloy including ABC100.30 powder with a density of 6.8 g/cm$^3$ and sintering at a temperature of 1000° C. and adding toughness.
Figure 23:
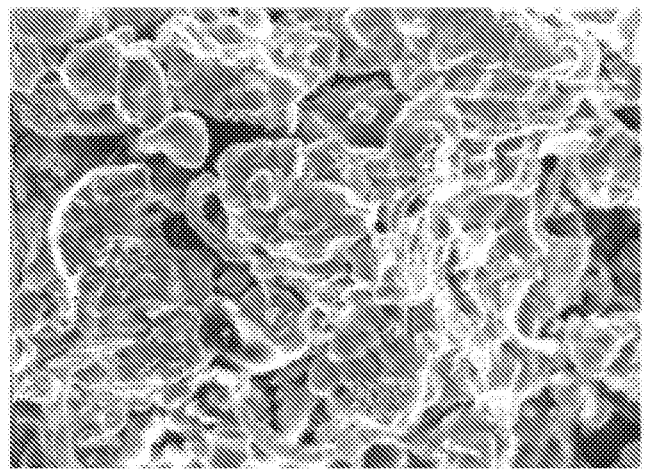
FIG. 23 is a scanning electron microscope photograph by 1000 magnifications of a tensile specimen according to an embodiment 2 of the present invention, that obtained by compacting the master alloy including DAB powder with a density of 6.8 g/cm$^3$ and sintering at a temperature of 1000° C. and adding toughness.
Figure 24:
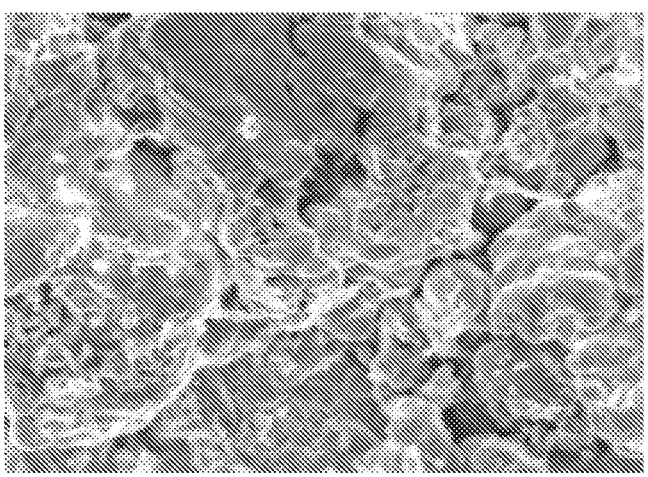
FIG. 24 is a scanning electron microscope photograph by 1000 magnifications of a tensile specimen according to an embodiment 2 of the present invention, that obtained by compacting the master alloy including DAE powder with a density of 6.8 g/cm$^3$ and sintering at a temperature of 1000° C. and adding toughness.
Figure 25:
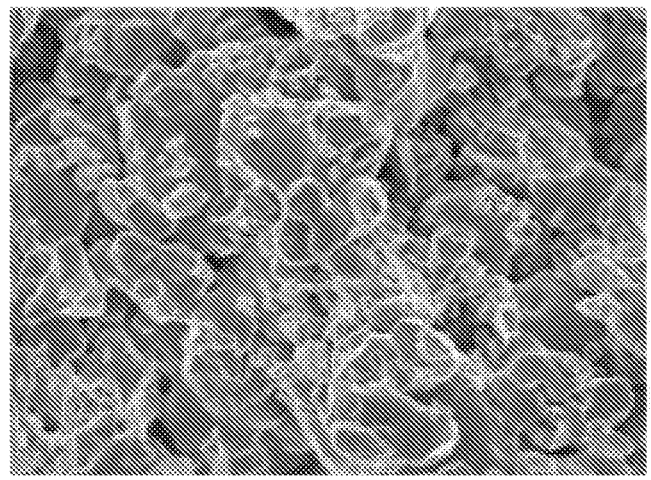
FIG. 25 is a scanning electron microscope photograph by 1000 magnifications of a tensile specimen according to an embodiment 2 of the present invention, that obtained by compacting the master alloy including PASC60 powder with a density of 6.8 g/cm$^3$ and sintering at a temperature of 1000° C. and adding toughness.
Figure 26:
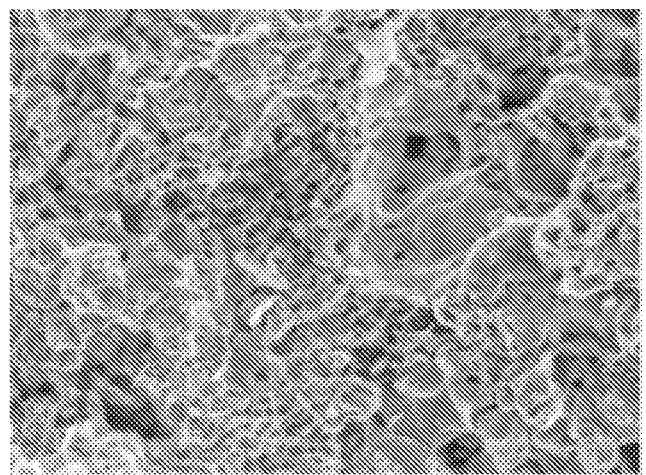
FIG. 26 is a scanning electron microscope photograph by 1000 magnifications of a tensile specimen according to an embodiment 2 of the present invention, that obtained by compacting the master alloy including KAP powder with a density of 6.8 g/cm$^3$ and sintering at a temperature of 1000° C. and adding toughness.
Figure 27:
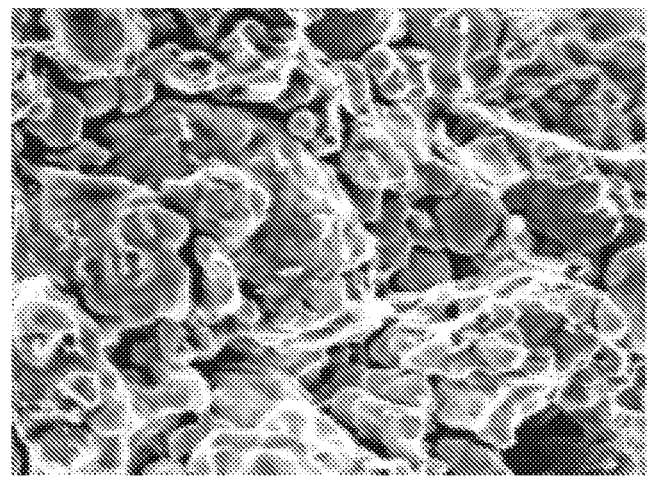
FIG. 27 is a scanning electron microscope photograph by 1000 magnifications of a tensile specimen according to an embodiment 2 of the present invention, that obtained by compacting the master alloy including pure copper powder with a density of 6.8 g/cm$^3$ and sintering at a temperature of 1000° C. and adding toughness.

Referring to 18, in a tensile specimen of PASC60 powder, it can be confirmed that the carbon nanotubes are uniformly generated and combined to the ruptured-sectional surface after adding the toughness. Also, in a tensile specimen of DAE powder, as shown in 19a, the carbon nanotubes are uniformly generated and combined to the ruptured-sectional surface, as shown in FIG. 19b, it may be confirmed that the carbon nanotubes that are generated and combined with the net shape in the surface of the metal powder is torn and separated from the ruptured part and it is judged that the sintered product has toughness rather than brittleness, Also, like the tensile specimen of PASC60 powder, shown in FIG. 20a and FIG. 20b, it may be confirmed that the carbon nanotubes are uniformly generated and combined to the ruptured-sectional surface after adding the toughness, and this shape is shown in FIG. 21 related to the tensile specimen of AHC100.29 powder, FIG. 22 related to the tensile specimen of ABC100.30 powder, FIG. 23 related to the tensile specimen of DAB powder, and FIG. 24 related to the tensile specimen of DAE powder. Referring to FIG. 25, a shape that the carbon nanotubes are alloyed is clear according to an outline of the metal powder in the tensile specimen of PASC powder, however, referring to FIG. 26 and FIG. 27, it may be found that the alloyed carbon nanotubes is not existed at the outline of the metal powder in the tensile specimen of KAP powder and the tensile specimen of a copper powder.

(3) Mechanical Property Measurement by Tensile Test

A result obtained with the same as the tensile test result of the embodiment 2 is shown in table 4 as following. As in the table 4, the tensile strength measurement results after suffering from the toughness adding process indicates that the change in tensile strength before/after adding the toughness is small, but the elongation is very increased.

TABLE 4

<The tensile strength and elongation measurement results according to the change in sintering temperature per powder types>

| Powder name | Sintering temperature | Before adding toughness (kgf/mm²) | | After adding toughness (kgf/mm²) | |
|---|---|---|---|---|---|
| | | Tensile strength (kgf/mm²) | Elongation (%) | Tensile strength (kgf/mm²) | Elongation (%) |
| AHC100.29 | 1000° C. | 14.14 | Less than 1 | 14.09 | 7.40 |
| | 1100° C. | 14.32 | Less than 1 | 13.68 | 12.72 |
| ABC100.30 | 1000° C. | 15.04 | Less than 1 | 19.64 | 10.04 |
| | 1100° C. | 16.09 | Less than 1 | 16.16 | 14.52 |
| DAB | 1000° C. | 16.47 | Less than 1 | 19.88 | 11.04 |
| | 1100° C. | 18.62 | Less than 1 | 21.93 | 12.20 |
| DAE | 1000° C. | 18.77 | Less than 1 | 23.61 | 9.88 |
| | 1100° C. | 22.81 | Less than 1 | 25.64 | 10.84 |
| PASC60 | 1000° C. | 22.87 | Less than 1 | 19.15 | 7.92 |
| | 1100° C. | 27.63 | Less than 1 | 25.99 | 8.96 |

Footnote 3) in the case of the sintering alloy for the automotive structure, the elongation is as follows. SMF 4020M is at least 1.0%, SMF 4030M is at least 2.0%, SMF 4040M is at least 1.2%, and SMF 9060M is at least 1.5%, based on the sintered finished product (approximately sintering temperature 1150° C.).

As described above, the present invention generates and combines the carbon nanotubes in the metal powders adjacent to the pores which exists in the sintered product to increase the toughness, making it possible to obtain the composite sintering materials with more excellent mechanical characteristics than the conventional sintered materials with strong brittleness.

Embodiment 3

(1) Manufacture of Sample (a) Process of Manufacturing Master

It is the same as the manufacturing process of the master alloy of the embodiment 1 except for selecting AHC100.29 powder, ABC100.30 powder, DAB powder, DAE powder, and PASC60 powder.

(b) Compacting Process

The manufactured master alloy is compacted in a tensile specimen shape to allow PASC60 and DAE powders to have density of 6.8 g/cm³ by being pressed by means of the press of 200 ton. The remaining processes are the same as the embodiment 1.

(c) Sintering Process

Each of the manufactured specimens are sintered for one hour at a temperature of 900° C., 1000° C., and 1100° C. The remaining processes are the same as the sintering process of the embodiment 1.

(d) Process of Generating Carbon Nanotube

It is the same as the generation process of the embodiment 2.

(e) Resintering Process

The manufactured toughness added finished product is resintered for one hour at a temperature of 1100° C.

The sintering atmosphere is performed under nitrogen atmosphere and a Mesh Belt sintering furnace is used.

(2) Mechanical Property Measurement by Tensile Test

A result obtained with the same as the tensile test result of the embodiment 3 is shown in table 5 as following. As in the table 5, in the tensile strength and elongation measurement results after suffering from the resintering process at a temperature of 1100° C., the elongation is slightly changed as compared to the toughness added sintered product, but the tensile strength is very increased.

TABLE 5

<The tensile strength and elongation measurement results after performing the resintering at 1100° C.>

| Powder name | Results of embodiment 2 | | Results of embodiment 3 | | |
|---|---|---|---|---|---|
| | Tensile strength (kgf/mm²) | Elonga-tion (%) | Initial sintering temperature | Tensile strength (kg f/mm²) | Elonga-tion (%) |
| AHC100.29 | 13.68 | 12.72 | 900° C. | 15.04 | 9.28 |
| | | | 1000° C. | 17.00 | 11.54 |
| | | | 1100° C. | 17.39 | 12.12 |
| ABC100.30 | 16.16 | 14.52 | 900° C. | 16.60 | 10.76 |
| | | | 1000° C. | 17.55 | 13.89 |
| | | | 1100° C. | 20.07 | 14.23 |
| DAB | 21.93 | 12.20 | 900° C. | 34.34 | 9.97 |
| | | | 1000° C. | 35.23 | 11.10 |
| | | | 1100° C. | 35.71 | 11.98 |
| DAE | 25.64 | 10.84 | 900° C. | 37.23 | 9.65 |
| | | | 1000° C. | 40.68 | 10.56 |
| | | | 1100° C. | 43.75 | 11.03 |
| PASC60 | 25.99 | 8.96 | 900° C. | 27.76 | 7.64 |
| | | | 1000° C. | 30.74 | 8.88 |
| | | | 1100° C. | 31.75 | 9.23 |

As described above, the present invention resinters, grows, and alloys the carbon nanotubes in the metal powders adjacent to the pores which exists in the sintered product to increase the strength and maintain the toughness, making it possible to obtain the composite sintering materials with more excellent mechanical characteristics with the intensified toughness and strength.

Embodiment 4

(1) Manufacture of Sample (a) a Manufacturing Process of a Master Alloy

It is the same as the manufacturing process of the master alloy of the embodiment 1 except for selecting DAE powder.

(b) Compacting Process 28

It is the same as the compacting process of the embodiment 2.

The manufactured master alloy is compacted in a tensile specimen shape to allow DAE powders to have density of 6.8 g/cm³ by being pressed by means of the press of 200 ton. The remaining processes are the same as the embodiment 1.

(c) Sintering Process

It is the same as the manufacturing process of the master alloy of the embodiment 1 except for sintering one hour at a temperature of 1100° C.

(d) Process of Generating Carbon Nanotube

It is the same as the generation process of the embodiment 2.

(e) Resintering Process

It is the same as the resintering process of the embodiment 3.

(f) Process of Re-Generating Carbon Nanotube The above described generation process of carbon nanotubes is repeated so as to add toughness one more time.

(2) Microstructure Analysis by Scanning Electron Microscope (SEM)

Figure 28:
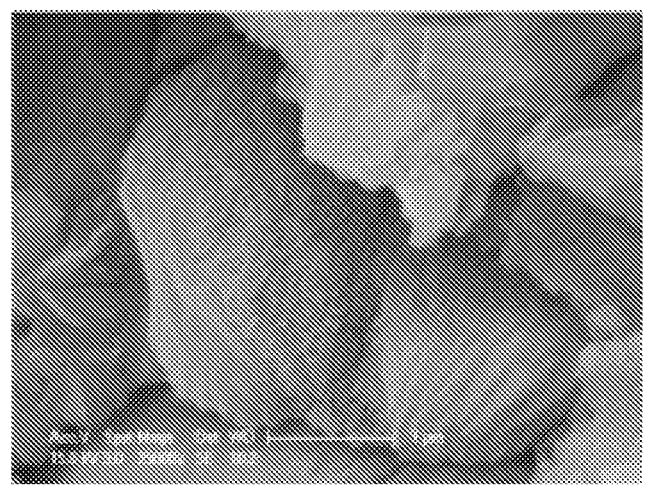
FIG. 28 is a scanning electron microscope photograph by 25000 magnifications of a tensile specimen according to an embodiment 4 of the present invention, that obtained by compacting the master alloy including DAE powder with a density of 6.8 g/cm$^3$ and sintering at a temperature of 1000° C. and adding toughness and resintering at a temperature of 1100° C.

FIG. 28 shows a generation, a growth, and an alloying shape of the carbon nanotubes by examining the tensile specimens manufactured by the process by means of the scanning electron microscope (SEM).

As shown in FIG. 28, it can be found that the carbon nanotubes mixed in the metal powder particles and the carbon nanotubes generated in the step of adding the toughness are grown and alloyed, and the carbon nanotubes are regenerated by suffering from the retoughness adding step after being resintered. It can be found that the mechanical properties are further strengthened by the repetition of sintering-toughness adding-resintering-retoughness adding-resintering processes.

Embodiment 5

(1) Manufacture of Sample (a) Process of Generating Carbon Nanotube

The carbon nanotubes are generated in PASC60 powder by uniformly mixing the PASC60 powder used as the sintered alloy for the automotive structure, which is an alloy powder of iron and phosphorous from Hoganas Co., with diluted HF solution, nital, diluted sulfuric acid or phosphoric acid using a spraying non-gravity mixer, and injecting ammonia while applying heat at a proper temperature and then injecting acetylene, methane gas, or carbonic acid gas.

(b) Compacting Process

It is the same as the compacting process of the embodiment 2.

(c) Sintering Process

It is the same as the sintering process of the embodiment 1 except for sintering one hour at a temperature of 600° C.

(2) Microstructure Analysis by Scanning Electron Microscope (SEM)

Figure 29:
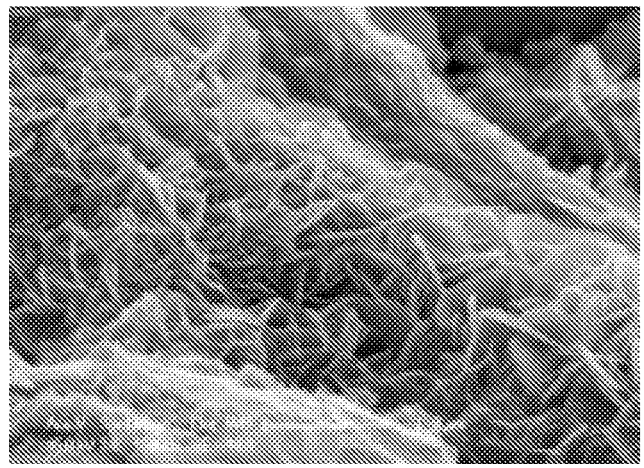
FIG. 29 is a scanning electron microscope photograph by 15000 magnifications of a tensile specimen according to an embodiment 5 of the present invention, that obtained by compacting the master alloy including PASC60 powder with a density of 6.8 g/cm$^3$ and sintering at a temperature of 600° C.

FIG. 29 is a scanning electron microscope photograph of a shape of carbon nanotubes generated at a sintering temperature of 600° C. in metal powder particles by photographing a sintered tensile specimen;

As shown in FIG. 29, it can be found that the carbon nanotubes covers the metal powder particles by being generated along with the carbon particles in the metal powder particles, but unlike the master alloy powder uniformly dispersing and combining the carbon nanotubes, they are not grown as large carbon nanotubes even at a sintering temperature of 600° C.

Embodiment 6

(1) Manufacture of Sample (a) Process of Generating Carbon Nanotube

It is the same as the process of generating carbon nanotube in the embodiment 5.

(b) Compacting Process

It is the same as the compacting process of the embodiment 5.

(c) Sintering Process

It is the same as the sintering process in the embodiment 4.

The manufactured specimen is sintered for one hour at a temperature of 1100° C.

(2) Mechanical Property Measurement by Tensile Test

A result obtained with the same as the tensile test result of the embodiment 6 is shown in table 6 as following.

As in the table 6, it can be found that the tensile strength and elongation are more increased than the specimen of the embodiment 1 made by mixing and combining the carbon nanotubes of 0.1%. It is judged that it is difficult to quantitatively measure the amount of the carbon nanotubes generated in the metal powder particles, but the larger amount of the carbon nanotubes is formed than the case where the carbon nanotubes of 0.1% is mixed. Also, it is judged that in the carbon nanotubes mixed and combined in the metal powder particles, the shape of the tubes is broken when exceeding a particular sintering temperature so that it has a little effect on the mechanical physical property values such as the elongation, while the shape of the carbon nanotubes formed in the metal powder particles is maintained at a temperature of 1100° C. so that it maintains the elongation even after being sintered at a temperature of 1100° C. It can be found that as the amount of the carbon nanotubes dispersed and combined in the metal powder particles is increased, the tensile strength is increased. However, since it is difficult to make quantifiable the amount of the carbon nanotubes generated, it is necessary to establish the working conditions conforming to the mechanical values.

TABLE 6

<The tensile strength measurement results after performing the sintering at 1100° C.>

| | | Embodiment 1 | | Embodiment 6 | |
|---|---|---|---|---|---|
| Powder name | Sintering temperature | Tensile strength (kgf/mm$^2$) | Elongation (%) | Tensile Strength (kgf/mm$^2$) | Elongation (%) |
| PASC60 | 1100° C. | 27.63 | Less than 1 | 39.40 | 8.67 |

Embodiment 7

(1) Manufacture of Sample
(a) Process of Generating Carbon Nanotube
It is the same as the process of generating carbon nanotube of the embodiment 5.
(b) Compacting Process
It is the same as the compacting process of the embodiment 5.
(c) Sintering Process
It is the same as the sintering process of the embodiment 4.
(d) Process of Further Generating Carbon Nanotube
It is the same as the process of generating carbon nanotube of the embodiment 2.
(e) Resintering Process
The remaining processes are the same as the embodiment 3 except for sintering a tensile specimen added with a toughness for one hour at a temperature of 600° C. and 1100° C.

(2) Mechanical Physical Property Measurement by Tensile Test

A result obtained with the same as the tensile test result of the embodiment 7 is shown in table 7 as following.

As in the Table 7, in the tensile strength and elongation measurement results after suffering from the resintering process and the generating process of the carbon nanotubes, the difference in the tensile strength and elongation are not large as compared to the specimen sintered after generating the carbon nanotubes in the metal powder particles. Also, the difference in the tensile strength of the specimen resintered at 600° C. is not large, but the tensile strength of the specimen resintered at 1100° C. is increased by about 10%. It means that when further generating and sintering the carbon nanotubes in the sintered product obtained from the embodiment 6, they should be sintered at the sintering temperature performing the further alloying in order to increase the mechanical strength.

TABLE 7

<The tensile strength and elongation measurement results>

| | Results of embodiment 6 | | | Results of embodiment 7 | | | |
|---|---|---|---|---|---|---|---|
| Powder name | Sintering temperature | Tensile strength (kgf/mm$^2$) | Elongation (%) | Sintering temperature | Resintering temperature | Tensile strength (kgf/mm$^2$) | Elongation (%) |
| PASC60 | 1100° C. | 39.40 | 8.67 | 1100° C. | 600° C. | 40.28 | 13.87 |
| | | | | | 1100° C. | 46.86 | 14.70 |

Embodiment 8

(1) Manufacture of Sample
(a) Compacting Process
It is the same as a compacting process of an embodiment 1 of the present invention except for selecting PASC60 powder and DAE powder.
(b) Process of Impregnating and Combining Carbon Nanotube
A manufactured compacted product is inserted to a vacuum impregnating machine, and an organic solution where carbon nanotubes are dispersed is impregnated in the pores of the molded product by using a vacuum impregnating machine and is heated at a proper temperature so that the carbon nanotubes are combined in the metal powder particles adjacent to the pores of the compacted product.
(c) Sintering Process
It is the same as a sintering process of an embodiment 4 of the present invention.
(2) Mechanical Physical Property Measurement by Tensile Test A result obtained with the same as the tensile test result of the embodiment 8 is shown in table 8 as following.

As in the Table 8, it can be found that the mechanical strength in the case where the carbon tubes are impregnated and sintered in the compacted product is weaker as compared to that in the case where the carbon nanotubes are mixed and sintered in metal powder particles. It is judged that since the carbon nanotubes are combined in the pores existing in the molded product to grow and alloy when the carbon tubes are impregnated in the compacted product, the disperse of the carbon nanotubes are more non-uniform and the amount of the carbon nanotubes is little to have a lower mechanical strength, as compare to the case where the carbon nanotubes are mixed and sintered in the metal powder particles.

TABLE 8

<The tensile strength measurement results after performing the sintering at 1100° C.>

| Powder name | Tensile strength (kgf/mm²) | |
| --- | --- | --- |
| | Results of embodiment 6 | Results of embodiment 7 |
| PASC60 | 27.63 | 23.45 |
| DAE | 22.81 | 19.87 |

Embodiment 9

(1) Manufacture of Sample (a) Compacting Process

It is the same as a compacting process of an embodiment 8 in the present invention.

(b) Process of Impregnating and Combining Carbon Nanotube

It is the same as the process of generating carbon nanotube of an embodiment 8 in the present invention.

(c) Sintering Process

It is the same as the sintering process of an embodiment 8 in the present invention.

(d) Process of Generating Carbon Nanotube

The toughness is added to a tensile specimen with the same as a generation process of carbon nanotubes of an embodiment 2 in the present invention.

(e) Resintering Process

The manufactured toughness adding finished product is resintered for one hour at a temperature of 600° C. and 1100° C. The remaining processes are the same as the embodiment 3.

It is the same as the resintering Process of an embodiment 7 in the present invention.

(2) Mechanical Physical Property Measurement by Tensile Test

A result obtained with the same as the tensile test result of the embodiment 9 is shown in table 94 as following.

As in the Table 9, it can be found that the tensile strength generating the carbon nanotubes in a specimen impregnating and sintering the carbon nanotubes in the compacted product obtained from the embodiment 8 and resintering them at a temperature of 600° C. is hardly changed as compared to the specimen obtained from the embodiment 8. However, the tensile strength of the specimen resintered at a temperature of 1000° C. is much more increased as compared to the specimen obtained from the embodiment 8. It can be found that the strength is increase only when the generated carbon nanotubes are resintered above the temperature that the alloy is made. Also, it can be found that although the elongation is different according to the resintering temperature, if the carbon nanotubes are generated, it is not greatly affected by the resintering temperature but has similar elongations.

TABLE 9

<The tensile strength and elongation measurement after adding toughness and resintering>

| | Results of embodiment 3 | | | Results of embodiment 9 | | |
| --- | --- | --- | --- | --- | --- | --- |
| Powder name | Sintering temperature | Tensile strength (kgf/mm²) | Elongation (%) | Resintering temperature | Tensile strength (kgf/mm²) | Elongation (%) |
| PASC60 | 1100° C. | 31.75 | 9.23 | 600° C. | 22.23 | 7.68 |
| | 1100° C. | 31.75 | 9.23 | 1100° C. | 34.52 | 9.73 |
| DAE | 1100° C. | 43.75 | 11.03 | 600° C. | 19.36 | 12.34 |
| | 1100° C. | 43.75 | 11.03 | 1100° C. | 34.73 | 11.79 |

Embodiment 10

(1) Manufacture of Sample (a) Compacting Process

It is the same as a compacting process of an embodiment 8 in the present invention.

(b) Process of Generating Carbon Nanotube

It is the same as the process of generating carbon nanotube of an embodiment 2 in the present invention.

(c) Sintering Process

It is the same as the sintering process of an embodiment 5 in the present invention.

(3) Microstructure Analysis by Scanning Electron Microscope (SEM)

To confirm a generation of a tensile specimen generated by sintering at a temperature of 600° C., Each of FIG. 30a to FIG. 31b are scanning electron microscope photographs by 20000-50000 magnifications and 5000-25000 magnifications.

Figure 30A:
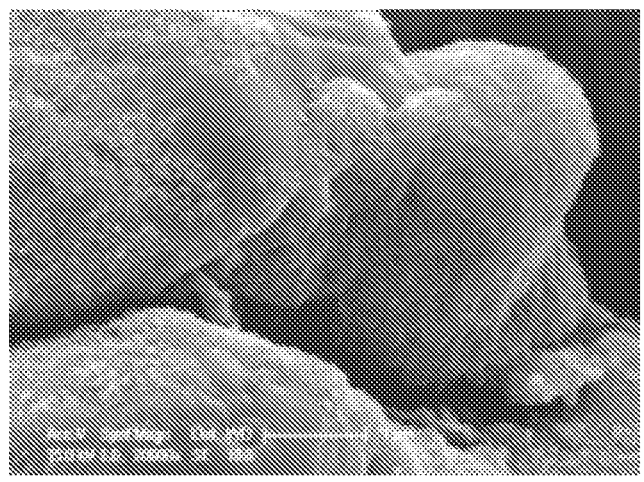
FIG. 30a is a scanning electron microscope photograph by 20000 magnifications of a tensile specimen according to an embodiment 10 of the present invention, that obtained by compacting the master alloy including PASC60 powder with a density of 6.8 g/cm$^3$ and sintering at a temperature of 600° C.
Figure 30B:
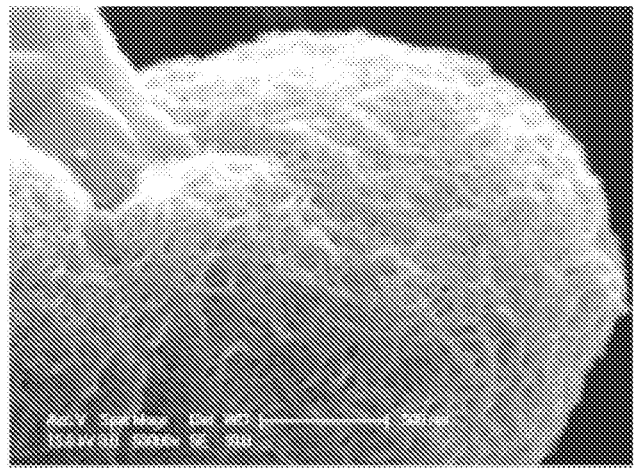
FIG. 30b is a scanning electron microscope photograph by 50000 magnifications of a tensile specimen according to an embodiment 10 of the present invention, that obtained by compacting the master alloy including PASC60 powder with a density of 6.8 g/cm$^3$ and sintering at a temperature of 600° C.
Figure 31A:
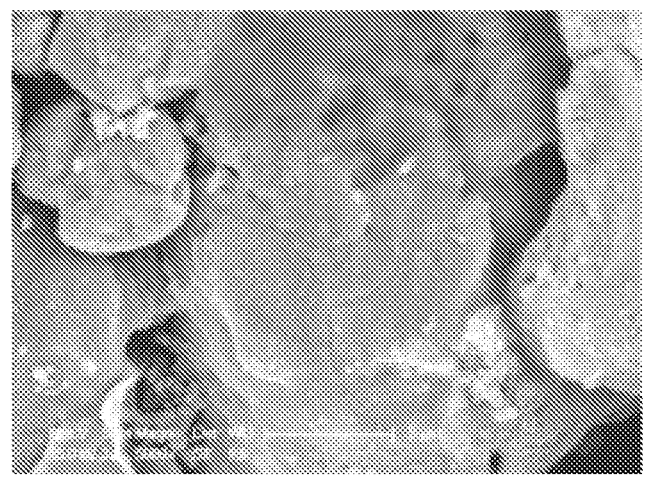
FIG. 31a is a scanning electron microscope photograph by 5000 magnifications of a tensile specimen according to an embodiment 10 of the present invention, that obtained by compacting the master alloy including DAE powder with a density of 6.8 g/cm$^3$ and sintering at a temperature of 600° C.
Figure 31B:
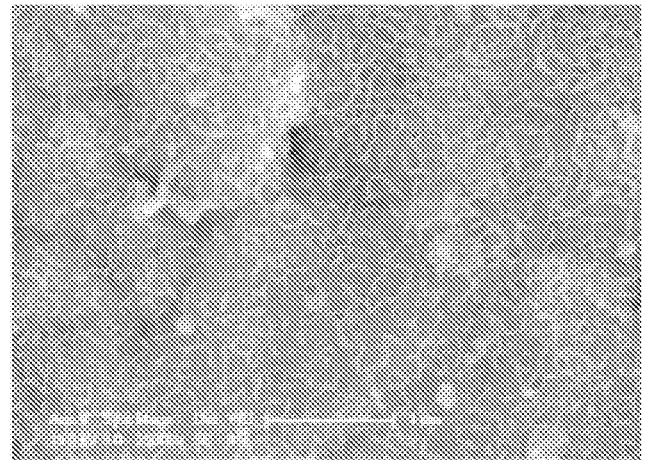
FIG. 31b is a scanning electron microscope photograph by 25000 magnifications of a tensile specimen according to an embodiment 10 of the present invention, that obtained by compacting the master alloy including DAE powder with a density of 6.8 g/cm$^3$ and sintering at a temperature of 600° C.

Referring to FIGS. 30a and 30b related a tensile specimen of PASC60 powder and FIGS. 31a and 31b related a tensile specimen of DAE powder, it may be found that the carbon nanotubes are generated in the metal powder particles adjacent to the pores of the sintered product in a net shape for two tensile specimens. However, it is shown that the carbon nanotubes generated in the present embodiment cannot be grown into a large carbon nanotube shape even at a sintering temperature of 600° C. compared with the tensile specimens which are mixed with the carbon nanotubes and sintered.

Embodiment 11

(1) Manufacture of Sample (a) Compacting Process

It is the same as the compacting process of an embodiment 8 in the present invention.

(d) Process of Generating Carbon Nanotube

It is the same as the process of generating carbon nanotube of an embodiment 2 in the present invention.

(c) Sintering Process

It is the same as the sintering process of an embodiment 4 in the present invention.

(2) Mechanical Property Measurement by Tensile Test

A result obtained with the same as the tensile test result of the embodiment 11 is shown in table 10 as following.

As in the Table 10, since the carbon nanotubes are generated in the metal powder particles adjacent to the pores of the sintered product, it is expected that the mechanical strength is more poor than the specimen generating the carbon nanotubes in the metal powder particles, but it can be found that the tensile strength is increased as compared to the specimen of the embodiment 1 made by mixing and combining the carbon nanotubes of 0.1% similarly to the Table 6. It means that in order to increase the mechanical strength of composite sintering metal materials, the amount of carbon nanotubes mixed or generated should be increased.

TABLE 10

<The tensile strength measurement results after performing the sintering at 1100° C.>

| Powder name | Tensile strength (kgf/mm²) | | |
|---|---|---|---|
| | Results of embodiment 1 | Results of embodiment 6 | Results of embodiment 11 |
| PASC60 | 27.63 | 39.40 | 32.05 |
| DAE | 22.81 | — | 27.81 |

Embodiment 12

(1) Manufacture of Sample
(a) Compacting Process
It is the same as the compacting process of an embodiment 8 in the present invention.
(b) Process of Generating Carbon Nanotube
It is the same as the process of generating carbon nanotube of an embodiment 2 in the present invention.
(c) Sintering Process
It is the same as the sintering process of an embodiment 5 in the present invention.
(d) Process of Further Generating Carbon Nanotube
Add toughness one more time to a tensile specimen with the same (b) process generating carbon nanotubes.
(e) Resintering Process
It is the same as the resintering process of an embodiment 7 in the present invention.

(2) Mechanical Property Measurement by Tensile Test
A result obtained with the same as the tensile test result of the embodiment 12 is shown in table 11 as following.
As in the Table 11, it can be found that the tensile strength of the specimens additionally generating carbon nanotubes after impregnating and sintering the carbon nanotubes in the compacted product and then generating the carbon nanotubes in a compacted product are higher as compared to that of the specimens generating the carbon nanotubes after impregnating and sintering the carbon nanotubes in the compacted product, but their elongation is almost the same. It means that the brittleness, which is a weak point of the sintered product, is improved by forming the carbon nanotubes in the pores of the compacted product.

TABLE 11

<The tensile strength and elongation measurement results after resintering>

| Powder name | Sintering temperature | Results of embodiment 9 | | Results of embodiment 12 | |
|---|---|---|---|---|---|
| | | Tensile strength (kgf/mm²) | Elongation (%) | Tensile strength (kgf/mm²) | Elongation (%) |
| PASC60 | 600° C. | 22.23 | 7.68 | 35.25 | 12.07 |
| | 1100° C. | 34.52 | 9.73 | 42.19 | 12.10 |
| DAE | 600° C. | 19.36 | 12.34 | 37.40 | 14.00 |
| | 1100° C. | 34.73 | 11.79 | 54.78 | 13.20 |

Embodiment 13

(1) Manufacture of Sample
(a) A Manufacturing Process of a Master Alloy
PASC60 powder and DAE powders with a powder size of 50 to 250 μm are inserted in a spraying non-gravity mixer along with carbon nanotubes and are spayed with diluted HF solution, nital, or phosphoric acid to obtain a master alloy.
(b) Compacting Process
It is the same as the compacting process of an embodiment 8 in the present invention.
(c) Process of Generating Carbon Nanotube
It is the same as the process of generating carbon nanotube of an embodiment 2 in the present invention.
(d) Sintering Process
It is the same as the sintering process of an embodiment 5 in the present invention.
(e) Process of Further Generating Carbon Nanotube
Add toughness one more time to a tensile specimen with the same (c) process generating carbon nanotubes.
(f) Resintering Process
It is the same the (d) Sintering process.

(2) Mechanical Physical Property Measurement by Tensile Test
A result obtained with the same as the tensile test result of the embodiment 13 is shown in table 12 as following.
As in the Table 12, the mechanical strength of the specimens generating carbon nanotubes by being chemically processed in a mixing step is higher as compared to that of the specimens generating carbon nanotubes by being molded and then chemically processed. It means that it is more advantageous for generating the carbon nanotubes when gas of carbon group generating the carbon nanotubes are chemically processed in a metal powder particle state.

TABLE 12

<The tensile strength and elongation measurement results after resintering>

| Powder name | Sintering temperature | Results of embodiment 12 | | Results of embodiment 13 | |
|---|---|---|---|---|---|
| | | Tensile strength (kgf/mm²) | Elongation (%) | Tensile strength (kgf/mm²) | Elongation (%) |
| PASC60 | 600° C. | 35.25 | 12.07 | 37.85 | 10.4 |
| | 1100° C. | 42.19 | 12.10 | 44.54 | 10.69 |
| DAE | 600° C. | 37.40 | 14.00 | 39.42 | 12.25 |
| | 1100° C. | 54.78 | 13.20 | 56.59 | 11.68 |

Embodiment 14

(1) Manufacture of Sample
(a) Compacting Process
It is the same as the compacting process of an embodiment 8 in the present invention.
(b) Sintering Process
It is the same as the sintering process of an embodiment 4 in the present invention.
(c) Process of Impregnating and Combining Carbon Nanotube
It is the same as the process of generating carbon nanotube of an embodiment 8 in the present invention.
(d) Resintering Process
It is the same as the resintering process of an embodiment 13 in the present invention.

(2) Mechanical Physical Property Measurement by Tensile Test

A result obtained with the same as the tensile test result of the embodiment 14 is shown in table 13 as following.

As in the Table 13, it can be found that the mechanical strength of the specimens mixing and sintering the carbon nanotubes in the metal powder particles, and then resintering them is higher as compared to that of the specimens resintering the specimens impregnating the carbon nanotubes in the sintered product. Also, the specimens resintering the specimens impregnating the carbon nanotubes in the sintered product has little elongation. It is shown that although the carbon nanotubes impregnated in the sintered product are impregnated and combined in the pores in the sintered product, the tube shape thereof is broken when they are sintered at a temperature of 1100° C., having no effects to increase the elongation.

TABLE 13

<The tensile strength and elongation measurement results after resintering>

| Powder name | Resintering temperature | Results of embodiment 3 | | Results of embodiment 14 | |
|---|---|---|---|---|---|
| | | Tensile strength (kgf/mm²) | Elongation (%) | Tensile strength (kgf/mm²) | Elongation (%) |
| PASC60 | 1100° C. | 31.75 | 9.23 | 29.76 | Less than 1% |
| DAE | 1100° C. | 43.75 | 11.03 | 32.75 | Less than 1% |

Embodiment 15

(1) Manufacture of Sample
(a) Compacting Process
It is the same as the compacting process of an embodiment 8 in the present invention.
(b) Sintering Process
It is the same as the sintering process of an embodiment 4 in the present invention.
(c) Process of Generating Carbon Nanotube
It is the same as the process of generating carbon nanotube of an embodiment 2 in the present invention.
(2) Microstructure Analysis by Scanning Electron Microscope (SEM)

Figure 32:
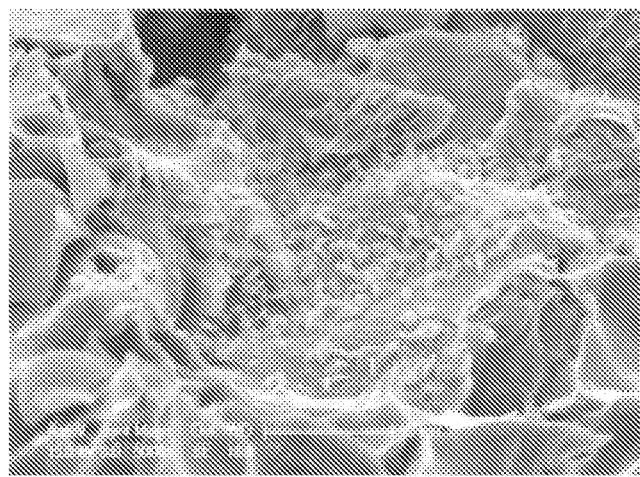
FIG. 32 is a scanning electron microscope photograph by 5000 magnifications of a tensile specimen according to an embodiment 15 of the present invention, that obtained by compacting the master alloy including PASC60 powder with a density of 6.8 g/cm$^3$ and sintering at a temperature of 1100° C.
Figure 33A:
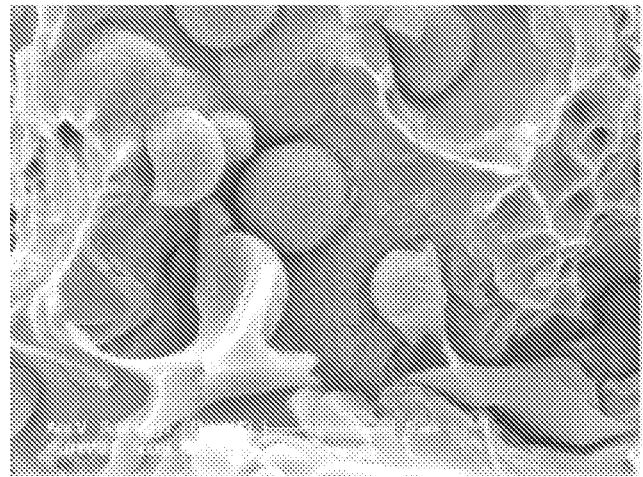
FIG. 33a is a scanning electron microscope photograph by 5000 magnifications of a tensile specimen according to an embodiment 15 of the present invention, that obtained by compacting the master alloy including DAE powder with a density of 6.8 g/cm$^3$ and sintering at a temperature of 1100° C.
Figure 33B:
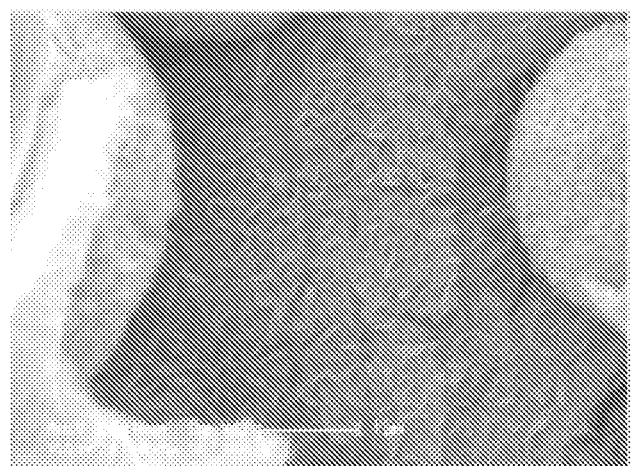
FIG. 33b is a scanning electron microscope photograph by 20000 magnifications of a tensile specimen according to an embodiment 15 of the present invention, that obtained by compacting the master alloy including DAE powder with a density of 6.8 g/cm$^3$ and sintering at a temperature of 1100° C.

Each of FIG. 32 and FIG. 33a and FIG. 33b is scanning electron microscopes by 5000 magnifications, and 5000-20000 magnifications illustrate the obtained tensile specimens.

Referring to FIG. 32 related a tensile specimen of PASC60 powder and FIGS. 33a and 33b related a tensile specimen of DAE powder, it may be found that the carbon nanotubes are generated in the metal powder particles adjacent to the pores of the sintered product in a net shape, thereby adding the toughness to the sintered product and dumping the brittleness.

(3) Mechanical Property Measurement by Tensile Test
A result obtained with the same as the tensile test result of the embodiment 15 is shown in table 14 as following.

As in the Table 14, since the carbon nanotubes are generated in the metal powder particles adjacent to the pores of the sintered product, it is expected that the mechanical strength is poor, but it can be found that the tensile strength is increased as compared to the specimen of the embodiment 2 made by mixing and combining the carbon nanotubes of 0.1% similarly to the table 6. It is judged that it is difficult to quantitatively measure the amount of the carbon nanotubes generated in the metal powder particles, but the larger amount of the carbon nanotubes is generated than the case where the carbon nanotubes of 0.1% is mixed. However, the slightly less elongation is indicated.

TABLE 14

<The tensile strength and elongation measurement results after adding toughness>

| Powder name | Sintering temperature | Results of embodiment 2 | | Results of embodiment 15 | |
|---|---|---|---|---|---|
| | | Tensile strength (kgf/mm²) | Elongation (%) | Tensile strength (kgf/mm²) | Elongation (%) |
| PASC60 | 1100° C. | 25.99 | 8.96 | 34.05 | 5.28 |
| DAE | 1100° C. | 25.64 | 10.84 | 34.60 | 8.44 |

Embodiment 16

(a) Compacting Process
It is the same as the compacting process of an embodiment 8 in the present invention.
(b) Sintering Process
It is the same as the compacting process of an embodiment 4 in the present invention.
(c) Process of Generating Carbon Nanotube
It is the same as the process of generating carbon nanotube of an embodiment 2 in the present invention.
(d) Resintering Process
It is the same as the resintering process of an embodiment 7 in the present invention.
(2) Mechanical Property Measurement by Tensile Test A result obtained with the same as the tensile test result of the embodiment 16 is shown in table 15 as following.

As in the table 15, the tensile strength is largely increased by generating the carbon nanotubes in the pores of the sintered product and then resintering and alloying them. It means that the mechanical physical property values can be increased by repeatedly performing the sintering process and the generating process of the carbon nanotubes.

TABLE 15

<The tensile strength and elongation measurement results>

| Powder name | Results of embodiment 3 | | | Results of embodiment 14 | | |
|---|---|---|---|---|---|---|
| | Sintering temperature | Tensile strength (kgf/mm²) | Elongation (%) | Resintering temperature | Tensile strength (kgf/mm²) | Elongation (%) |
| PASC60 | 1100° C. | 34.05 | 5.28 | 600° C. | 37.13 | 11.10 |
| | | | | 1100° C. | 39.47 | 10.23 |
| DAE | 1100° C. | 34.60 | 8.44 | 600° C. | 43.07 | 13.27 |
| | | | | 1100° C. | 58.70 | 13.73 |

Embodiment 17

(1) Manufacture of Sample
(a) Sintering Process
The sintered finished product is manufactured as SMF 4040M material, which is the sintered alloy for the automotive structure.
(b) Process of Generating Carbon Nanotube
It is the same as the process of generating carbon nanotube of an embodiment 8 in the present invention.

(c) Resintering Process

It is the same as the sintering process of an embodiment 4 in the present invention.

(2) Mechanical Property Measurement by Tensile Test

A result obtained with the same as the tensile test result of the embodiment 17 is shown in table 16 as following.

As in the table 16, it can be found that the mechanical characteristics of the existing sintered product can be strengthened by generating the carbon nanotubes in the pores of the existing sintered product or impregnating and combining the carbon nanotubes therein and then repeatedly performing the sintering process and the generating process of the carbon nanotubes or the impregnating and combining processes of the carbon nanotubes.

TABLE 16

<The tensile strength and elongation measurement results>

| | Tensile strength (kgf/mm$^2$) | | |
|---|---|---|---|
| Material name | Existing sintered product | Only carbon nanotube sintered product | Resintered sintered product |
| SMF4040M | 42.29 (Elongation: 1.2% or more) | 52.05 (Elongation: 5% level) | 63.64 (Elongation: 10% level) |

As described above, the composite sintering materials using the carbon nanotubes of the present invention is completed by uniformly combining the carbon nanotubes in the metal powder particles or generating the carbon nanotubes therein and growing, alloying, and sintering them or by impregnating and combining the carbon nanotubes in the compacted product or the sintered product or generating the carbon nanotubes in the pores in the compacted product or the sintered product and growing, alloying, and sintering them so that they can be used as the material of the automotive parts, etc.

INDUSTRIAL APPLICABILITY

As described above, the composite sintering materials and a manufacturing method thereof have excellent mechanical, thermal, and electric and electronic characteristics as well as have effects of lowered sintering temperature and material cost reduction so that they are useful as materials for automotive parts, electric and electronic parts, space and aircraft parts, and molding and cutting tools.

What is claimed is:

1. A method of manufacturing composite sintering materials using carbon nanotubes, comprising:
    compacting one metal powder selected from the group consisting of pure iron powder, pure copper powder, iron/copper/nickel/molybdenum alloy powder, iron/phosphorous powder, and iron/tin alloy powder to obtain a predetermined form;
    heating the predetermined form in an atmosphere of nitrogen gas for sintering;
    uniformly spraying a diluted HF solution, nital, diluted sulfuric acid, or diluted phosphoric acid to a sintered product obtained by the sintering;
    injecting ammonia gas to the product, to which the diluted HF solution, nital, diluted sulfuric acid, or diluted phosphoric acid has been sprayed, while maintaining an appropriate temperature, to generate carbon nano tubes;
    injecting acetylene gas, methane gas, or carbon dioxide gas to combine the generated carbon nano tubes to the metal powder for further generating the carbon nano tubes; and
    re-sintering the sintered product in the atmosphere of nitrogen gas to grow the generated carbon nano tubes.

* * * * *